(12) United States Patent
Kang et al.

(10) Patent No.: US 8,963,428 B2
(45) Date of Patent: Feb. 24, 2015

(54) LED LIGHTING CONTROL APPARATUS AND LED LIGHTING CONTROL SYSTEM USING THE SAME

(71) Applicant: Electronics and Telecommunications Research Institute, Daejeon (KR)

(72) Inventors: Hyun-Joo Kang, Daejeon (KR); Jung-Sik Sung, Daejeon (KR); Tae-Gyu Kang, Daejeon (KR); Hyun-Seok Kim, Daejeon (KR); Jin-Doo Jeong, Daejeon (KR); Hyun-Chul Kang, Daejeon (KR); Seong-Hee Park, Daejeon (KR); Dae-Ho Kim, Daejeon (KR); You-Jin Kim, Daejeon (KR); In-Su Kim, Daejeon (KR); Il-Soon Jang, Daejeon (KR); Sang-Kyu Lim, Daejeon (KR); Myung-Soon Kim, Daejeon (KR); Hyun-Jong Kim, Cheongju-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/210,878

(22) Filed: Mar. 14, 2014

(65) Prior Publication Data
US 2014/0306609 A1 Oct. 16, 2014

(30) Foreign Application Priority Data

Apr. 16, 2013 (KR) ........................ 10-2013-0041394

(51) Int. Cl.
*H05B 33/08* (2006.01)
*H05B 37/02* (2006.01)

(52) U.S. Cl.
CPC .......... *H05B 33/086* (2013.01); *H05B 33/0872* (2013.01); *H05B 37/0245* (2013.01)

USPC ......................................................... 315/117

(58) Field of Classification Search
USPC ......... 315/112–118, 129, 130, 291, 294, 297, 315/148–153
See application file for complete search history.

(56) References Cited

U.S. PATENT DOCUMENTS

2011/0001436 A1* 1/2011 Chemel et al. ................ 315/291
2012/0169249 A1 7/2012 Loveland et al.

FOREIGN PATENT DOCUMENTS

| KR | 1020090088952 A | 8/2009 |
| KR | 1020120027503 A | 3/2012 |
| WO | 2008070981 A1 | 6/2008 |

*Primary Examiner* — Tung X Le
*Assistant Examiner* — Jonathan Cooper
(74) *Attorney, Agent, or Firm* — William Park & Associates Patent Ltd.

(57) ABSTRACT

Disclosed herein are an LED lighting control apparatus and an LED lighting control system using the apparatus. The proposed system includes a wired lighting unit connected to LED lighting in a wired manner and configured to perform lighting control on LED lighting. A wireless lighting unit performs lighting control on the LED lighting via wireless communication with a wireless terminal and operates in conjunction with the wired lighting unit. A location communication unit allocates individual IDs of LED lighting and performs transmission/reception of data to/from an external terminal. A multi-sensor unit supports multiple sensors and analyzes sensor data collected from the multiple sensors. An active heat dissipation unit dissipates heat from the LED lighting based on analyzed sensor data. A processor control unit controls operations of the wired lighting unit, the wireless lighting unit, the location communication unit, the multi-sensor unit, and the active heat dissipation unit.

11 Claims, 16 Drawing Sheets

LED LIGHTING CONTROL APPARATUS AND LED LIGHTING CONTROL SYSTEM USING THE SAME

CROSS REFERENCE TO RELATED APPLICATION

This application claims the benefit of Korean Patent Application No. 10-2013-0041394 filed on Apr. 16, 2013, which is hereby incorporated by reference in its entirety into this application.

BACKGROUND OF THE INVENTION

1. Technical Field

The present invention relates generally to a Light Emitting Diode (LED) lighting control apparatus and an LED lighting control system using the apparatus and, more particularly, to an LED lighting control system, which includes a multi-fusion sensor function, a wired/wireless communication and location ID communication function, an active heat dissipation function, a smart Switched Mode Power Supply (SMPS) function, and a driving function and to an LED lighting control apparatus employed in the LED lighting control system.

2. Description of the Related Art

As existing Light Emitting Diode (LED) lighting is combined into various types of consumer-centered technologies, a variety of technologies have appeared. Accordingly, various forms ranging from the function of receiving sensor information and turning on/off lighting, a lighting dimming control function using wireless communication, and an interworking function for wired lighting control such as for 0-10 V, Digital Multiplex (DMX), and Digital Addressable Lighting Interface (DALI), to a recent LED Visible Light Communication (VLC) function have been presented.

However, since there is no interface which is operating in conjunction with various types of technologies and which is standardized, there is a disadvantage in that products are incompatible with each other.

Further, a current lighting control system has been widely used in the fields of large-scale lighting applications such as construction lighting, stage illumination, and roadway lighting, and has high cost and limited functionality when the lighting control system is manufactured in conformity with preferences desired by typical customers.

Korean Patent Application Publication No. 10-2009-0088952 (entitled "Lighting control system and method") presents a system and method for controlling lighting.

The lighting control system presented in Korean Patent Application Publication No. 10-2009-0088952 is a system for controlling the generation of light from one or more light-emitting elements in response to an external input, and includes a control interface module configured to receive an external input and convert the external input based on a pre-defined internal control protocol, and a light generation module connected to the control interface module via communication and connected to and operated by the one or more light-emitting elements so as to control the one or more light-emitting elements in response to the converted input.

The above-described technology disclosed in Korean Patent Application Publication No. 10-2009-0088952 describes the control interface module for receiving a control protocol and converting the control protocol into a light generation control input and a control system and method related to communication connection. This technology may be regarded as being different from the description of a standardized structure of a module for system lighting and a software structure for lighting application in the present invention.

Korean Patent Application Publication No. 10-2012-0027503 (entitled "System and apparatus for automatically deriving and revising personal preferences applicable to a plurality of controllable lighting networks") presents a system and apparatus for deriving and revising personal preferences related to controllable lighting networks, and for using communication technology so as to utilize the personal preferences.

The system presented in Korean Patent Application Publication No. 10-2012-0027503 is a system for deriving personal preferences related to at least one controllable lighting network. The system includes at least one processor configured to execute a recognition module and an inference engine; and memory configured to store the identifier of a user associated with a plurality of adjustment operations and corresponding situations. In the processor, the recognition module detects the identifier of the user, performs a plurality of adjustment operations on at least one controllable lighting network requested by the user, and detects situations corresponding to the plurality of adjustment operations, respectively, and the inference engine analyzes the plurality of adjustment operations and the corresponding situations so as to identify correlations between the adjustment operations and the situations, and generates at least one personal preference rule associated with the identifier of the user based on the identified correlations.

The above-described technology disclosed in Korean Patent Application Publication No. 10-2012-0027503 illustrates a structure for storing situations and lighting control information as an embodiment in order to derive the personal preferences of the user, but the present invention does not require such a structure.

SUMMARY OF THE INVENTION

Accordingly, the present invention has been made keeping in mind the above problems occurring in the prior art, and an object of the present invention is to provide an LED lighting control apparatus and an LED lighting control system using the apparatus, which present a system lighting structure enabling parts to be modularized together with a standard platform and enabling various parts to be accommodated, thus utilizing lighting as an information infrastructure, and which perform effective monitoring and control management, thus reducing energy consumption and management costs.

In accordance with an aspect of the present invention to accomplish the above object, there is provided a Light Emitting Diode (LED) lighting control apparatus including a failure diagnosis/lifetime prediction control unit for diagnosing whether LED lighting has failed and predicting a remaining lifetime of the LED lighting, based on temperature sensor information and drive current sensor information of the LED lighting; a color temperature/illuminance correction control unit for adjusting color temperature and illuminance of the LED lighting, based on color temperature sensor information and illuminance sensor information of the LED lighting; a wireless lighting control processing unit for interpreting a lighting control command for the LED lighting received in a wireless manner, and performing lighting control corresponding to the lighting control command; a wired lighting control processing unit for, as input data is lighting control information for the LED lighting connected in a wired manner, sending the lighting control information to a driving unit for driving the LED lighting; an active heat dissipation control unit for actively dissipating heat from the LED lighting, based on the temperature sensor information and the drive current sensor information of the LED lighting; and a location identification (ID) setting processing unit for providing location ID information of the LED lighting.

Preferably, the failure diagnosis/lifetime prediction control unit may include a feature extraction unit for extracting feature data based on a measured illuminance value, an internal temperature value of the lighting, and a Pulse Width Modulation (PWM) output sensing value of the lighting, which are externally applied; a signal logic analysis unit for deriving a curve indicative of a form of variations in the feature data, extracted by the feature extraction unit, depending on time; a Mean Time To Failure (MTTF) function generation unit for generating an MTTF function based on the lighting internal temperature value, the lighting PWM output sensing value, and parameter value information of a pre-stored light source attenuation curve; an MTTF prediction model creation unit for generating a mean time to failure of the LED lighting by using the measured illuminance value, the lighting internal temperature value, and the lighting PWM output sensing value as inputs, based on results derived by the signal logic analysis unit; a multiplexer (MUX) unit for selecting any one of output of the MTTF function generation unit and output of the MTTF prediction model creation unit, depending on required precision; a lifetime prediction unit for predicting a remaining lifetime of the LED lighting, based on the mean time to failure output from the MUX unit and a pre-stored operating time of the LED lighting; and a failure diagnosis unit for diagnosing whether the LED lighting has failed, based on the remaining lifetime of the LED lighting predicted by the lifetime prediction unit and a pre-stored failure determination reference time.

Preferably, the lifetime prediction unit may predict a difference between the mean time to failure, output from the MUX unit, and the pre-stored operating time of the LED lighting, as the remaining lifetime of the LED lighting.

Preferably, the failure diagnosis unit may diagnose the LED lighting as having failed if the remaining lifetime of the LED lighting predicted by the lifetime prediction unit is equal to or less than the pre-stored failure determination reference time.

Preferably, the failure diagnosis/lifetime prediction control unit may further include a preprocessing unit for preprocessing the measured illuminance value, the lighting internal temperature value, and the lighting PWM output sensing value, and transmitting results of preprocessing to the feature extraction unit and the MTTF function generation unit.

In accordance with another aspect of the present invention to accomplish the above object, there is provided a Light Emitting Diode (LED) lighting control system including a wired lighting unit connected to LED lighting in a wired manner and configured to perform lighting control on the LED lighting; wireless lighting unit configured to perform lighting control on the LED lighting via wireless communication with a wireless terminal and to operate in conjunction with the wired lighting unit; a location communication unit configured to allocate individual IDs of the LED lighting and perform transmission/reception of data to/from an external terminal; a multi-sensor unit configured to support multiple sensors and analyze sensor data collected from the multiple sensors; an active heat dissipation unit configured to dissipate heat from the LED lighting based on the sensor data analyzed by the multi-sensor unit; and a processor control unit configured to control operations of the wired lighting unit, the wireless lighting unit, the location communication unit, the multi-sensor unit, and the active heat dissipation unit.

Preferably, the LED lighting may include a main lighting device and a sub-lighting device connected to the main lighting device, and the wired lighting unit may include a Digital Addressable Lighting Interface (DALI) transceiver and an Ethernet transceiver for the main lighting device, and comprises a DALI transceiver for the sub-lighting device.

Preferably, the wireless lighting unit may perform wireless communication with the wireless terminal via one of Zigbee wireless communication and WiFi wireless communication.

Preferably, the wireless lighting unit may include a wireless simple lighting control unit for turning on/off the LED lighting, adjusting illuminance of the LED lighting, and monitoring the LED lighting in real time; a wireless smart lighting control unit for turning on/off power of the LED lighting on a group basis, adjusting illuminance of lighting of each group, controlling a structure of a wireless lighting network, and monitoring and reporting a state of the LED lighting; a wireless communication unit for performing a wireless interface with the wireless terminal; and a conversion protocol unit for operating in conjunction with the wired lighting unit.

Preferably, the location communication unit may perform transmission/reception of data to/from the external terminal via one of data transmission/reception using visible light communication, and video and streaming data transmission/reception using lighting communication transmission/reception.

Preferably, the processor control unit may include a failure diagnosis/lifetime prediction control unit for diagnosing whether LED lighting has failed and predicting a remaining lifetime of the LED lighting, based on temperature sensor information and drive current sensor information of the LED lighting; a color temperature/illuminance correction control unit for adjusting color temperature and illuminance of the LED lighting, based on color temperature sensor information and illuminance sensor information of the LED lighting; a wireless lighting control processing unit for interpreting a lighting control command for the LED lighting received in a wireless manner, and performing lighting control corresponding to the lighting control command; a wired lighting control processing unit for, as input data is lighting control information for the LED lighting connected in a wired manner, sending the lighting control information to a driving unit for driving the LED lighting; an active heat dissipation control unit for actively dissipating heat from the LED lighting, based on the temperature sensor information and the drive current sensor information of the LED lighting; and a location ID setting processing unit for providing location ID information of the LED lighting.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
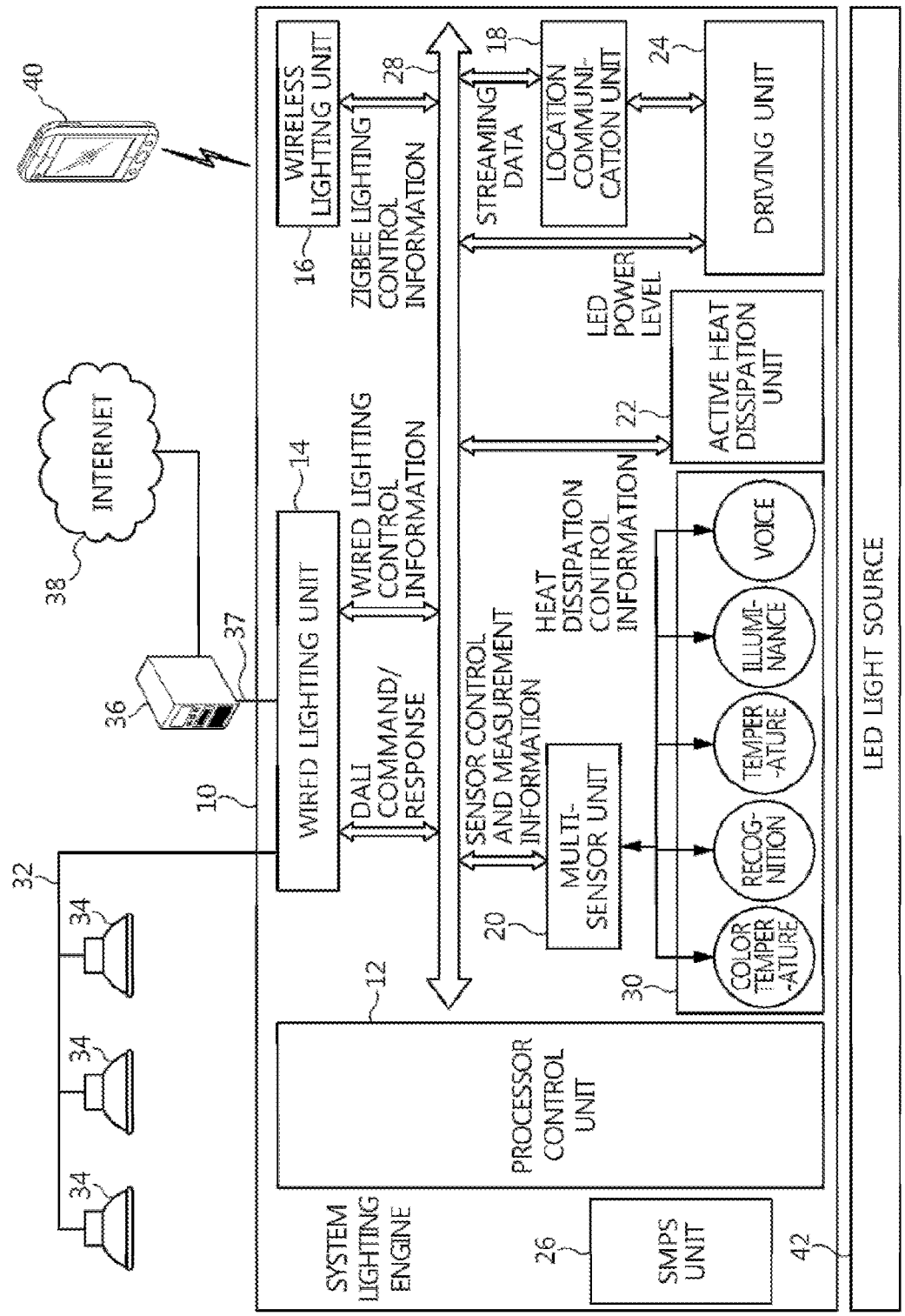
FIG. 1 is a configuration diagram showing the engine of LED system lighting employing an LED lighting control apparatus according to an embodiment of the present invention.

A Light Emitting Diode (LED) lighting control system denotes an intelligent lighting system which provides a wired/wireless lighting control device for reducing the energy consumption of lighting load equipment, efficiently managing resources, and enabling the use of optimized LED lighting via the analysis of a usage environment, and which controls lighting equipment in unused space while operating in conjunction with building management systems or the like. Therefore, the LED lighting control system may be understood to be an LED system lighting in which Information Technology (IT) is integrated into existing LED lighting.

Hereinafter, an LED lighting control apparatus and an LED lighting control system using the apparatus according to embodiments of the present invention will be described in detail with reference to the attached drawings. Prior to the detailed description of the present invention, it should be noted that the terms or words used in the present specification and the accompanying claims should not be limitedly interpreted as having their common meanings or those found in dictionaries. Therefore, the embodiments described in the present specification and constructions shown in the drawings are only the most preferable embodiments of the present invention, and are not representative of the entire technical spirit of the present invention. Accordingly, it should be understood that various equivalents and modifications capable of replacing the embodiments and constructions of the present invention might be present at the time at which the present invention was filed.

FIG. 1 is a configuration diagram showing the engine of an LED system lighting employing an LED lighting control apparatus according to an embodiment of the present invention. In this case, it may be considered that a system lighting engine 10 shown in FIG. 1 is an LED lighting control system, and a processor control unit 12 is an LED lighting control apparatus.

The system lighting engine 10 of FIG. 1 is composed of components taking charge of communication, sensor, heat dissipation, LED driving, and system processing functions. The system lighting engine 10 includes a processor control unit 12 for performing the Central Processing Unit (CPU) function of the system lighting, a wired lighting unit 14 for performing a wired communication function, a wireless lighting unit 16 for performing a wireless communication function, a location communication unit 18 for performing communication based on location information (for example, based on a Global Positioning System: GPS), a multi-sensor unit 20 for supporting multiple sensors 30, an active heat dissipation unit 22 for supporting active heat dissipation, a driving unit 24 for supporting LED driving, and a switched-mode power supply (SMPS) unit 26 for supporting smart power.

The individual units 12 to 26 shown in FIG. 1 interface with each other through a System Lighting Standard Interface (SLSI) 28.

The processor control unit 12 is a component for performing the software functions of the respective units. Accordingly, the processor control unit 12 supports process management and handling functions so that software processing functions such as location recognition, Digital Addressable Lighting Interface (DALI) wired communication, dimming ON/OFF, wireless smart lighting control, failure (fault) diagnosis processing, active heat dissipation, lifetime prediction processing, failure diagnosis and lifetime prediction, video transmission, streaming transmission, communication control such as remote and security wireless control, area-based illuminance control, color temperature and illuminance correction, and recognition processing may be performed. In this case, DALI is a lighting control protocol which allows lighting to be controlled by transmitting a digital control signal to two communication lines.

The wired lighting unit 14 may not only control sub-lighting devices 34 functioning as DALI devices by performing the master function of a DALI 32, but also remotely control lighting via a lighting control server 36 and the Internet 38 by supporting the Ethernet 37.

The wireless lighting unit 16 supports functions so that lighting control is possible using a wireless terminal 40 equipped with a communication function, such as a Zigbee or WiFi function.

The multi-sensor unit 20 supports multiple sensors 30, such as color temperature, recognition, temperature, illuminance, and voice sensors. The multi-sensor unit 20 analyzes sensor data collected from the multiple sensors 30 and supports an intelligent sensor control algorithm and processing scheme conforming to purposes such as temporal and spatial purposes.

Various lighting control functions are finally transferred from the processor control unit 12 to the driving unit 24, thus enabling an LED light source 42 to be controlled.

Figure 2:
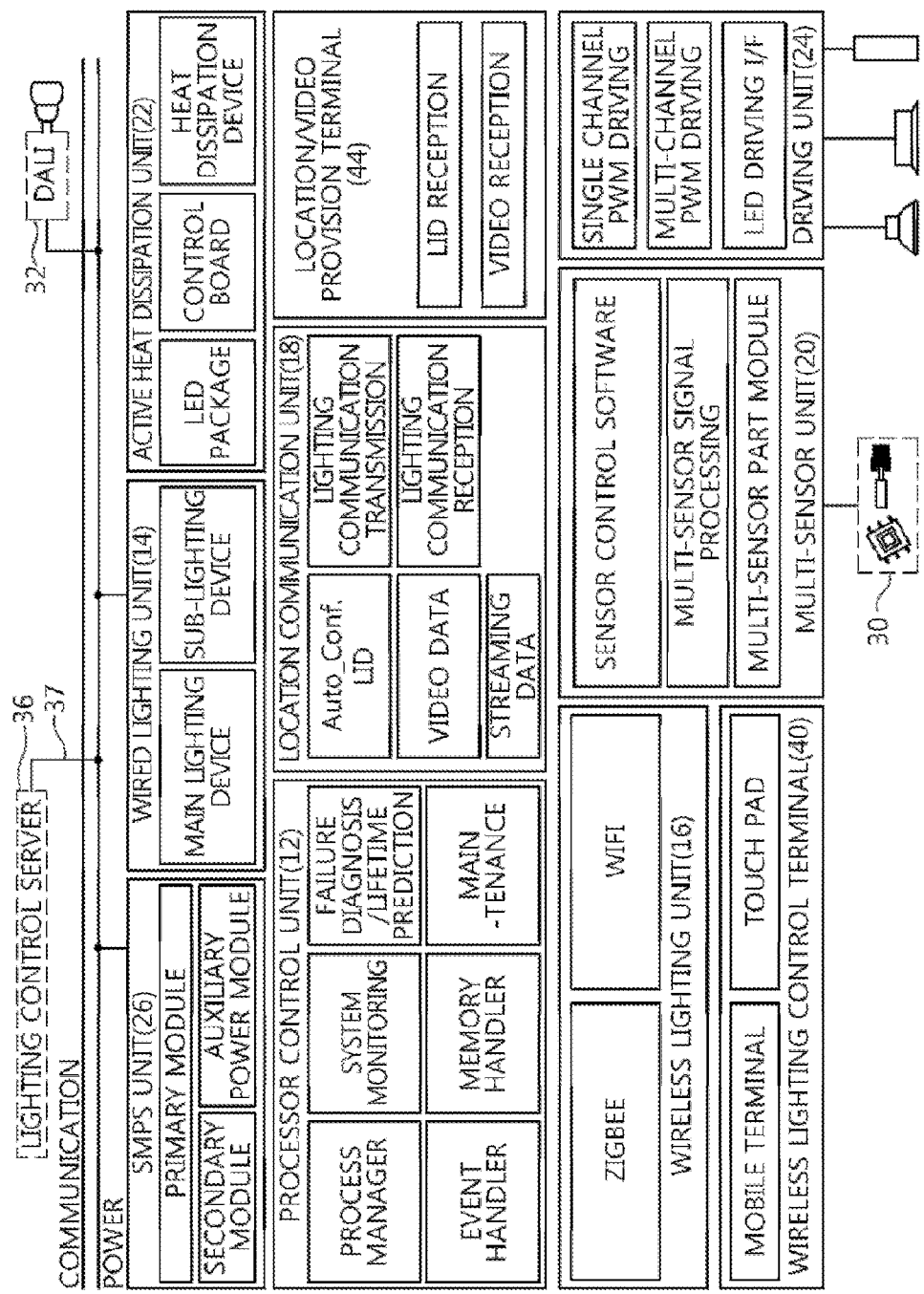
FIG. 2 is a functional block diagram showing individual units shown in FIG. 1.

FIG. 2 is a functional block diagram showing the individual units shown in FIG. 1.

The processor control unit 12 allocates software running on the system lighting engine 10 to individual processes, and supports the software so that the individual processes may be operated in harmony with each other. For this, the processor control unit 12 may include a processor manager, a system monitoring block, a failure diagnosis and lifetime prediction block, an event handler, a memory handler, a maintenance block, etc.

The wired lighting unit 14 is configured such that a main lighting device and a sub-lighting device are configured as different functional blocks, respectively. Since the main lighting device simultaneously supports DALI and the Ethernet, it has a DALI transceiver and an Ethernet transceiver. In contrast, since the sub-lighting device supports only DALI, it has a DALI transceiver. That is, the main lighting device has DALI device-related functional blocks (a DALI transceiver, a DALI header processing block, a DALI command processing block, and a DALI actuator), and Ethernet device-related functional blocks for Ethernet processing and remote control using the Internet (an Ethernet transceiver, a DALI/User Datagram Protocol (UDP) header processing block, a content transmission/reception block, and a remote maintenance block). In contrast, the sub-lighting device has DALI device-related functional blocks, such as a DALI transceiver, a DALI header processing block, a DALI command processing block, and a DALI actuator, which perform part of the functions of the main lighting device.

The wireless lighting unit 16 includes a Zigbee block for supporting Zigbee wireless communication and a WiFi block for supporting WiFi wireless communication. The Zigbee block includes functional blocks which can perform Zigbee transmission/reception, wireless individual lighting control, an efficient network configuration function, group lighting control, etc. (that is, wireless simple lighting control, wireless complex lighting control, wireless lighting network, and Zigbee transmission/reception modules), and an 0-10 V interworking block for supporting an interworking function so that 0-10 V networks which are existing lighting networks may be controlled in system lighting, and a miniaturization-support block. The WiFi block includes a WiFi transmission/reception block for supporting WiFi wireless communication, a WiFi-wired lighting conversion protocol block for operating in conjunction with the wired lighting unit 14, and a lighting-only WiFi Access Point (AP) block for supporting a lighting-specific function.

The location communication unit 18 includes an Automatic Configuration (Auto-Conf) Location ID (LID) block for automatically allocating individual IDs to lighting, a lighting communication transmission block for performing data transmission using LED Visible Light Communication (VLC), a lighting communication reception block for performing data reception using LED VLC, a video data block for transferring video data using lighting communication transmission/reception, and a streaming data block for functioning to transfer streaming data using lighting communication transmission/reception.

The multi-sensor unit 20 includes a multi-sensor part block which includes hardware modules such as color temperature, illuminance, temperature, recognition, and voice sensors, a multi-sensor signal processing block which transfers sensor signal processing to the processor control unit 12 via the SLSI 28, and a sensor control software block which is executed to be ported to the processor control unit 12. Here, the sensor control software block includes a sensor data detection block, a sensor integrated management block, a sensor data analysis block, an adaptive sensor control block, and a sensor data integrated interworking block. The sensor data detection block collects pieces of raw data from the respective sensors and extracts sensor information. Further, the sensor data detection block functions to convert the extracted sensor information into valid data and generate valid sensor data. The sensor integrated management block performs a device management function while operating in conjunction with the sensor data integrated interworking block so as to manage various types of multiple sensors. The multi-sensor unit 20 may perform management such as the registration/change/deletion of each individual sensor via device management. Further, the multi-sensor unit 20 may manage the multiple sensors 30 of integrated lighting in an integrated manner by grouping the multiple sensors 30. The sensor data analysis block functions to analyze multi-sensor data extracted from the sensor information, infer an intelligent multi-sensor control algorithm, and generate the integrated metadata of the multiple sensors. The adaptive sensor control block functions to control multiple sensor devices based on the extracted sensor information.

The active heat dissipation unit 22 actively supports a heat dissipation function by setting a heat dissipation target or range to an LED package, a control board, and a heat-dissipation device. In order to actively dissipate heat from the LED lighting, there may be supported a scheme for dissipating heat by actively controlling Pulse Width Modulation (PWM) current if a temperature equal to or higher than a threshold is sensed by a temperature sensor, a scheme using a temperature sensing and control algorithm on a control board, and a scheme for reducing the generation of heat by minimizing the weight of a cooling device itself and manufacturing the cooling device using a chimney effect. Accordingly, the block for supporting the heat dissipation function of the LED package includes a high-temperature sensing current breaking block and an ultra-light heat dissipation block. The block for supporting the heat dissipation function of the control board includes an active PWM control block and a slim heat dissipation block. The block for supporting the heat dissipation function of the heat dissipation device includes an active cooling control block and a high-efficiency heat dissipation block.

The driving unit 24 includes a single channel PWM driving block for controlling the LED light source 42, a multi-channel PWM driving block for controlling the LED light source 42, and an LED driving interface block for interfacing with the LED light source 42.

The SMPS unit 26 includes a primary module for power supply, a secondary module for power supply, and an auxiliary power module which is an auxiliary power supply device. The primary module supports a low-power embedded SMPS, and a smart SMPS having a long lifetime of 30,000 hours or longer and having efficiency of 90% or more. The secondary module minimizes an output ripple by utilizing a digital Direct Current (DC)-DC conversion algorithm equipped with a processor and by optimizing an operating frequency in consideration of output errors. The auxiliary power module supports an auxiliary power device so that the energy consumption of a main power device may be reduced by minimizing standby power using a sleep and wake-up method.

In FIG. 2, the wireless terminal 40 may be implemented as a mobile terminal equipped with a Zigbee or WiFi communication function, a touch pad equipped with a Zigbee or WiFi communication function, or the like, and is also referred to as a wireless lighting control terminal. A location/video provision terminal 44 includes an LID reception block and a video reception block.

Figure 3:
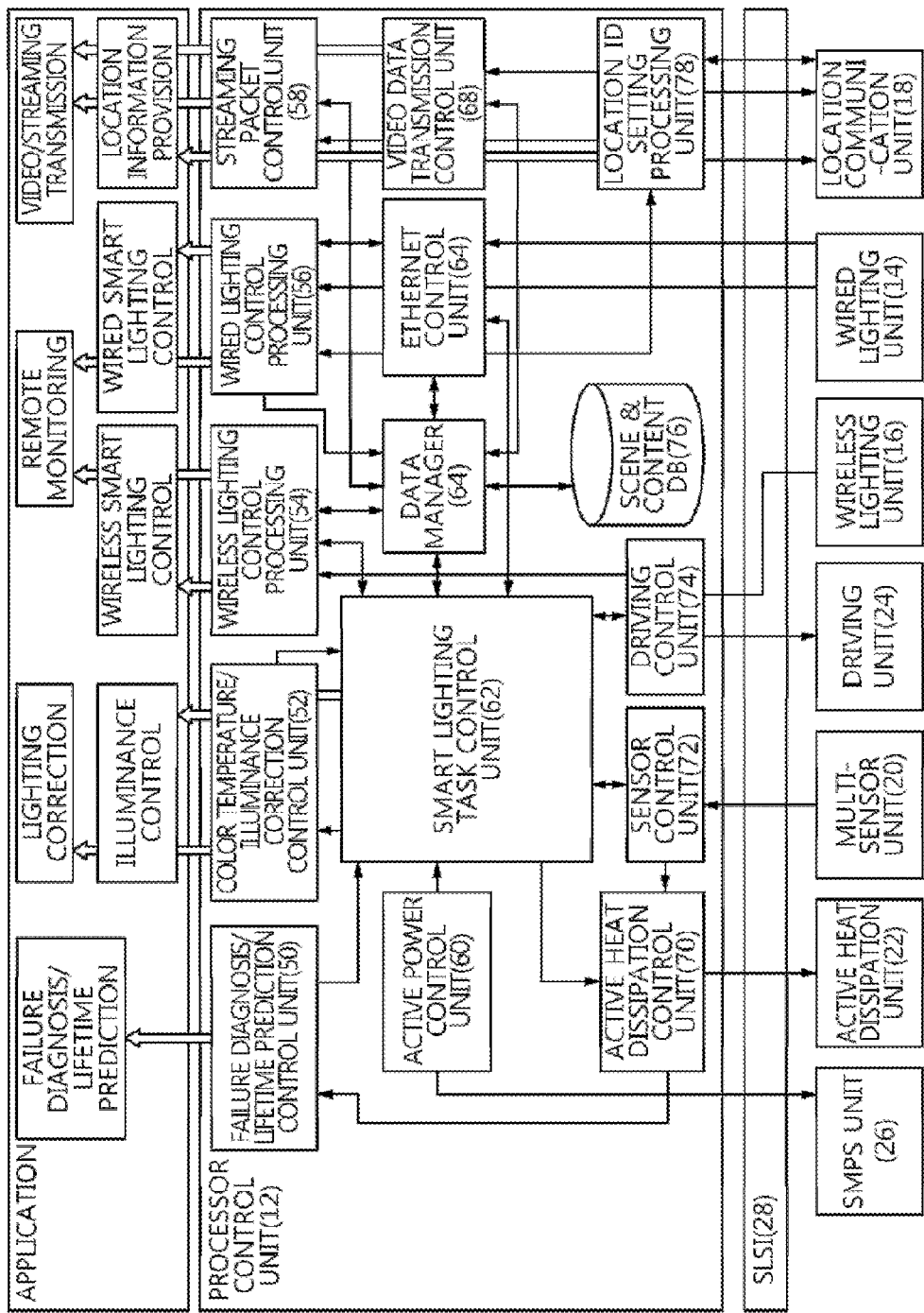
FIG. 3 is a diagram showing interworking between software modules required when the individual units shown in FIG. 1 operate in conjunction with each other to provide an application.

FIG. 3 is a block diagram showing interworking between software modules required when the individual units shown in FIG. 1 operate in conjunction with each other to provide an application. The processor control unit 12 and peripheral parts, that is, the wired lighting unit 14, the wireless lighting unit 16, the location communication unit 18, the multi-sensor unit 20, the active heat dissipation unit 22, the driving unit 24, and the SMPS unit 26 operate in conjunction with each other to provide applications. FIG. 3 shows interworking between software modules required for that case.

In order to provide a failure diagnosis and lifetime prediction application, the processor control unit 12 reads temperature sensor information from the multi-sensor unit 20, and transfers the read information to a failure diagnosis/lifetime prediction control unit 50. Further, the temperature sensor information is transmitted to an active heat dissipation control unit 70 by a sensor control unit 72. The active heat dissipation control unit 70 drives or maintains the active heat dissipation unit 22 so as to extend the lifetime of the LED lighting based on the temperature sensor information, and transmits the results of driving or maintenance to the failure diagnosis/lifetime prediction control unit 50. The failure diagnosis/lifetime prediction control unit 50 provides a failure diagnosis and lifetime prediction application by incorporating the received information into an algorithm.

In order to provide a lighting correction and illuminance control application, the color temperature and illuminance sensor information of the multi-sensor unit 20 is input to a color temperature/illuminance correction control unit 52 via the sensor control unit 72 and the smart lighting task control unit 62 of the processor control unit 12. The color temperature/illuminance correction control unit 52 processes the correction of color temperature and illuminance based on the input color temperature and illuminance sensor information. The results of the processing by the color temperature/illuminance correction control unit 52 are transferred to a driving control unit 74 via the smart lighting task control unit 62 and are applied to the driving unit 24 so as to adjust the illuminance of the LED lighting. The smart lighting task control unit 62 may include a task scheduler, a real-time clock, a resource manager, an interrupt handler, and an inter-task communication block.

In order to provide a wireless smart lighting control application, a lighting control command input from the wireless lighting unit 16 is applied to a wireless lighting control processing unit 54 via the driving control unit 74. The wireless lighting control processing unit 54 interprets the input lighting control command, and thereafter sends a lighting control command for ON/OFF operation of lighting or for a change in a dimming value to the driving control unit 74 via the smart lighting task control unit 62, thus enabling the driving unit 24 to adjust LED lighting in a hardware manner. Further, the wireless smart lighting control application includes the function of reading values input from the multi-sensor unit 20 or the wired lighting unit 14, the information of the smart lighting task control unit 62, and the information of a scene and content storage device 76, and displaying pieces of information input through a data manager 64 on the screen of the wireless lighting unit 16 via the wireless lighting control processing unit 54.

In order to provide a wired smart lighting control application, a wired lighting control processing unit 56 analyzes the data received from the wired lighting unit 14, and processes the data by causing the data to branch into three cases. That is, in a case where the control of lighting is required, if the smart lighting task control unit 62 changes the data to a lighting instruction through the data manager 64 and sends the lighting instruction to the driving control unit 74, the driving control unit 74 transfers lighting control information to the driving unit 24. Second, in a case where data input to the wired lighting control processing unit 56 includes a location ID (LID), the LID is transferred to the location communication unit 18 via a location ID setting processing unit 78. Finally, in a case where the data received by the wired lighting control processing unit 56 is video data, the video data is processed so that video information can be stored in the scene and content storage device 76 via the data manager 64.

In order to provide a remote monitoring application, lighting control information input to the wireless lighting control processing unit 54 and the wired lighting control processing unit 56 is remotely monitored.

In order to provide a video/streaming transmission application, a streaming packet control unit 58 interprets a user command input from the wireless lighting control processing unit 54 and the wired lighting control processing unit 56, reads data from the scene and content storage device 76 via the data manager 64, and outputs the read data to the location communication unit 18 in order to perform communication via the LED light source 42. Alternatively, in order to provide the video/streaming transmission application, content selection information input from the location communication unit 18 is analyzed, related video data is read, and then streaming is provided.

In order to provide a location information provision application, the location ID setting processing unit 78 sends location ID information to the location communication unit 18 so as to provide the location information of lighting. The location communication unit 18 reads the ID information of actual lighting based on the input location ID information, and sends the ID information to the location ID setting processing unit 78, wherein the ID information of the actual lighting is used by a video data transmission control unit 68.

Figure 4:
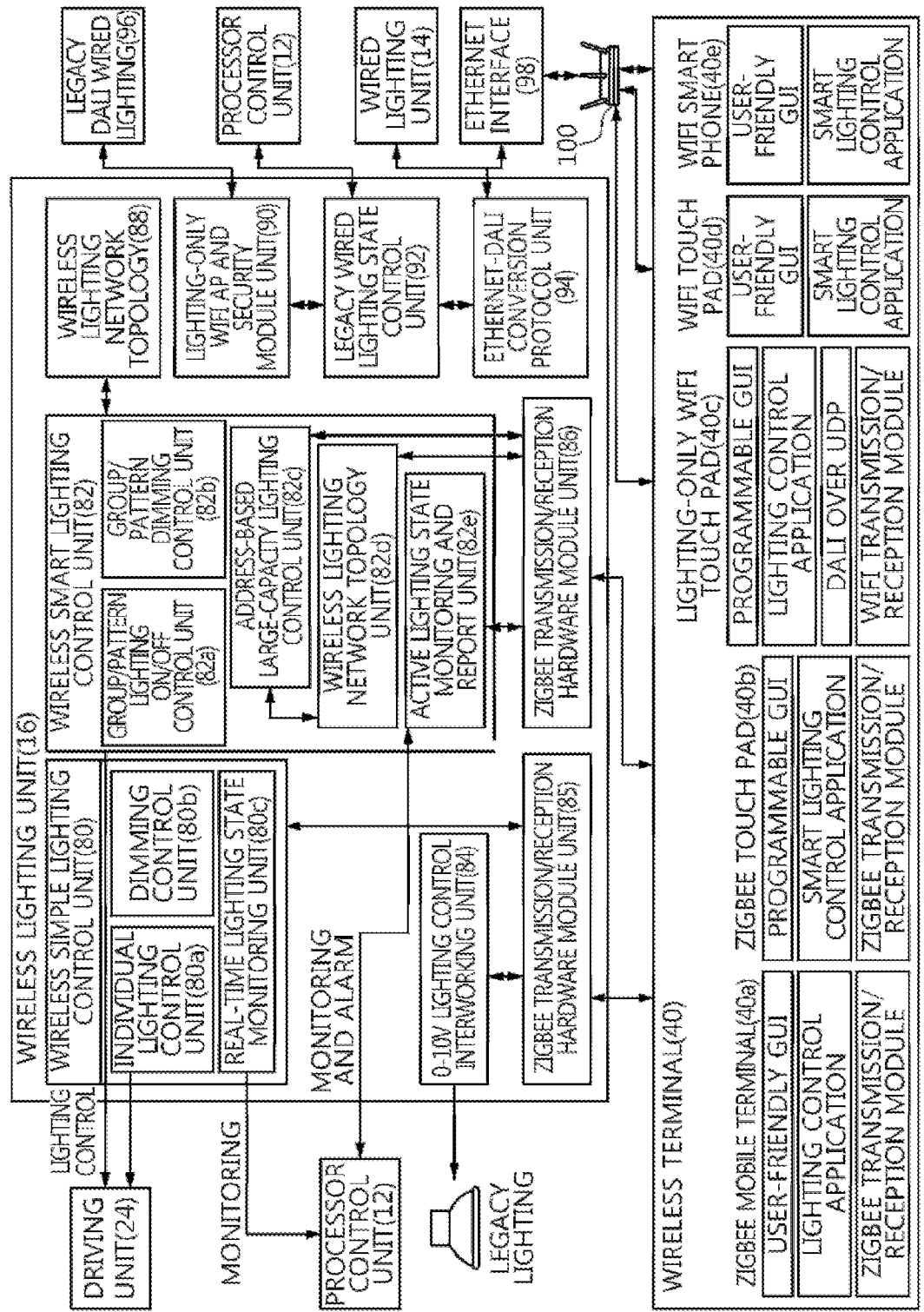
FIG. 4 is a diagram showing the configuration of a wireless lighting unit shown in FIG. 1.

FIG. 4 is a diagram showing the configuration of the wireless lighting unit shown in FIG. 1. In FIG. 4, the wireless lighting unit 16 includes a wireless simple lighting control unit 80, a wireless smart lighting control unit 82, a 0-10V lighting control interworking unit 84, Zigbee transmission/reception hardware module units 85 and 86, a wireless lighting network topology 88, a lighting-only WiFi AP and security module unit 90, a legacy wired lighting state control unit 92, and an Ethernet-DALI conversion protocol unit 94.

The wireless simple lighting control unit 80 includes an individual lighting control unit 80a for taking charge of the ON/OFF operation of lighting, a dimming control unit 80b for controlling the illuminance of the lighting, and a real-time lighting state monitoring unit 80c for monitoring the lighting in real time.

The wireless smart lighting control unit 82 includes a group/pattern lighting ON/OFF control unit 82a for turning on/off the lighting on a lighting group basis, a group/pattern dimming control unit 82b for controlling the illuminance of each lighting group, an address-based large-capacity lighting control unit 82c for controlling large-capacity lighting, a wireless lighting network topology unit 82d for controlling the structure of a wireless lighting network, and an active lighting state monitoring and report unit 82e for monitoring and reporting the state of the lighting.

In this case, the wireless simple lighting control unit 80 and the wireless smart lighting control unit 82 operate in conjunction with the driving unit 24, and transfer information to the processor control unit 12.

The 0-10V lighting control interworking unit 84 operates in conjunction with existing lighting.

The Zigbee transmission/reception hardware module units 85 and 86 are functional blocks for a wireless interface. The Zigbee transmission/reception hardware module units 85 and 86 may be examples of a wireless communication unit described in the accompanying claims of the present invention.

The wireless lighting network topology unit 88 configures and manages a wireless network topology for operating in conjunction with about 256 lighting devices. The wireless lighting network topology unit 88 provides topology information to the wireless smart lighting control unit 82.

The lighting-only WiFi AP and security module unit 90 operates in conjunction with existing Digital Addressable Lighting Interface (DALI) wired lighting 96.

The legacy wired lighting state control unit 92 notifies the processor control unit 12 of the state of the existing wired lighting.

The Ethernet-DALI conversion protocol unit 94, which is configured to perform Ethernet-DALI conversion, functions to allow the wired lighting unit 14 and the Ethernet interface 98 to operate in conjunction with each other.

The wireless terminal 40 shown in FIG. 4 is a device for transferring lighting control information while operating in conjunction with the wireless lighting unit 16 or a commercial WiFi Access Point (AP) 100. The wireless terminal 40 may be a device such as a Zigbee mobile terminal 40a, a Zigbee touch pad 40b, a lighting-only WiFi touch pad 40c, a WiFi touch pad 40d, or a WiFi smart phone 40e. Here, each of the devices 40a, 40b, and 40c is equipped with a Zigbee transmission/reception module. Each of the devices 40a, 40b, 40c, 40d, and 40e is equipped with an application module for lighting control (that is, a smart lighting control application module). Further, each of the devices 40a, 40b, 40c, 40d, and 40e is equipped with a user-friendly Graphical User Interface (GUI) or a GUI for user operation. For example the Zigbee touch pad 40b and the lighting-only WiFi touch pad 40c are each equipped with a programmable GUI module, and the Zigbee mobile terminal 40a, the WiFi touch pad 40d, and the WiFi smart phone 40e are each equipped with a user-friendly GUI module. A difference between the user-friendly GUI and the programmable GUI is present in that a GUI provided to be configurable for lighting control in the device is called a user-friendly GUI, and a GUI to which the function of programming lighting control in a form desired by the user is added is called a programmable GUI. For example, a dimming control function for a designated lighting group may be performed by the user-friendly GUI module, and the function of newly creating groups and executing dimming control for individual groups may be performed by the programmable GUI module.

Figure 5:
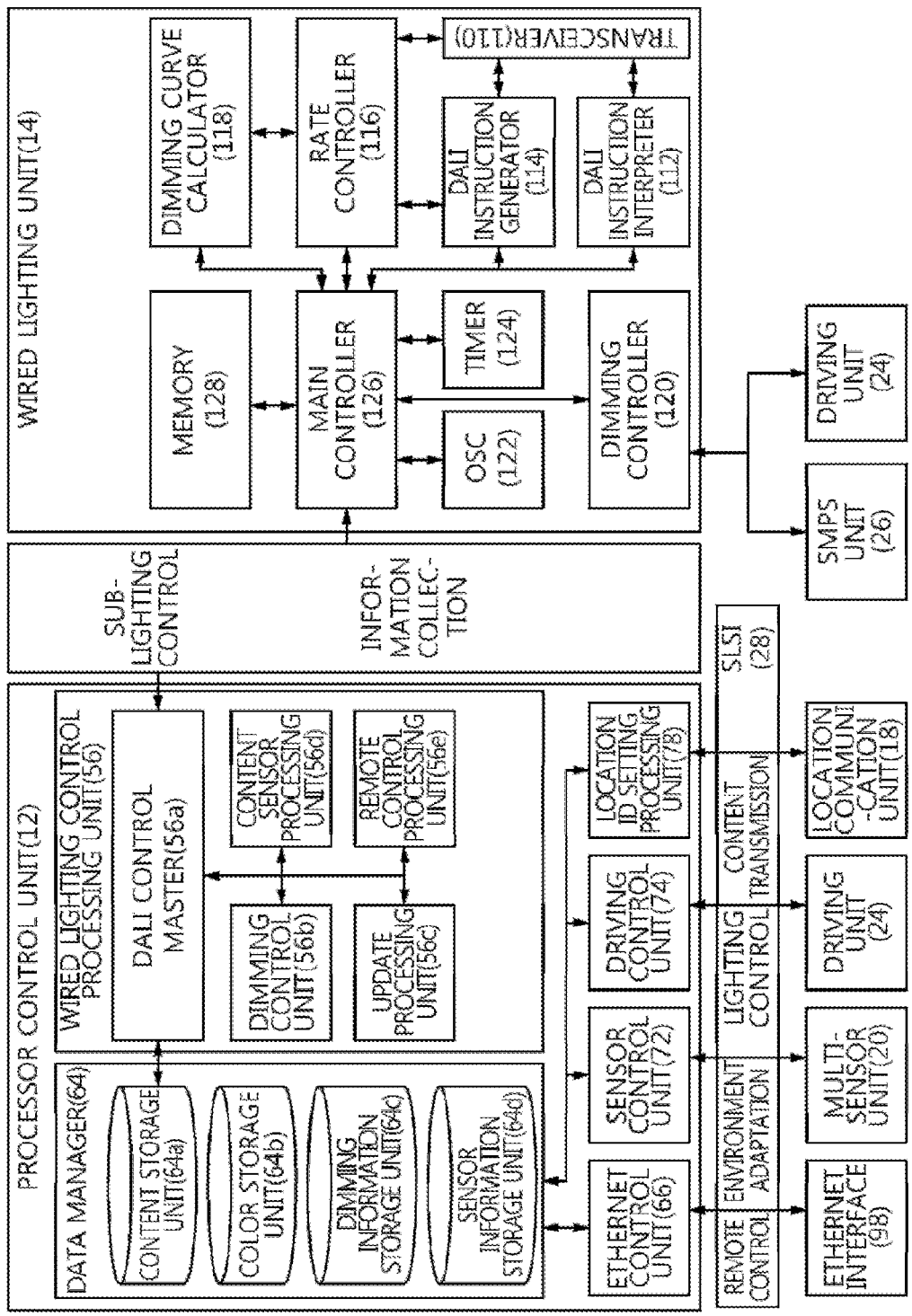
FIG. 5 is a diagram showing the configuration of a wired lighting unit shown in FIG. 1.

FIG. 5 is a diagram showing the configuration of the wired light unit shown in FIG. 1.

For wired lighting control, the processor control unit 12, the wired lighting unit 14, and a standard interface, that is, the System Lighting Standard Interface (SLSI) 28 must operate in conjunction with each other.

In relation to wired lighting control, the processor control unit 12 includes a data manager 64 and a wired lighting control processing unit 56. The data manager 64 includes a content storage unit 64a, a color storage unit 64b, a dimming information storage unit 64c, and a sensor information storage unit 64d. The wired lighting control processing unit 56 includes a DALI control master 56a for processing DALI information, a dimming control unit 56b for processing information related to dimming among pieces of lighting control information transferred to the DALI, an update processing unit 56c for processing information corresponding to lighting update among the pieces of lighting control information transferred to the DALI, a content sensor processing unit 56d for processing content received through the DALI, and a remote control processing unit 56e for receiving remotely input lighting control information and transferring the information to the DALI control master 56a.

Here, each of the data manager 64 and the wired lighting control processing unit 56 operates in conjunction with respective parts (that is, the Ethernet interface 98, the multi-sensor unit 20, the driving unit 24, and the location communication unit 18) via an Ethernet control unit 66, a sensor control unit 72, a driving control unit 74, and a location ID setting processing unit 78.

The wired lighting unit 14 includes a transceiver for a DALI stack 110, a DALI instruction interpreter 112, a DALI instruction generator 114, a rate controller 116, a dimming curve calculator 118, a dimming controller 120, an Oscillator (OSC) 122, a timer 124, a main controller 126 for processing wired lighting control information, and memory 128 for temporarily storing related information to process DALI protocols. The dimming controller 120 operates in conjunction with the driving unit 24 and the SMPS unit 26 related to existing lighting (legacy lighting) that is to be directly controlled.

Figure 6:
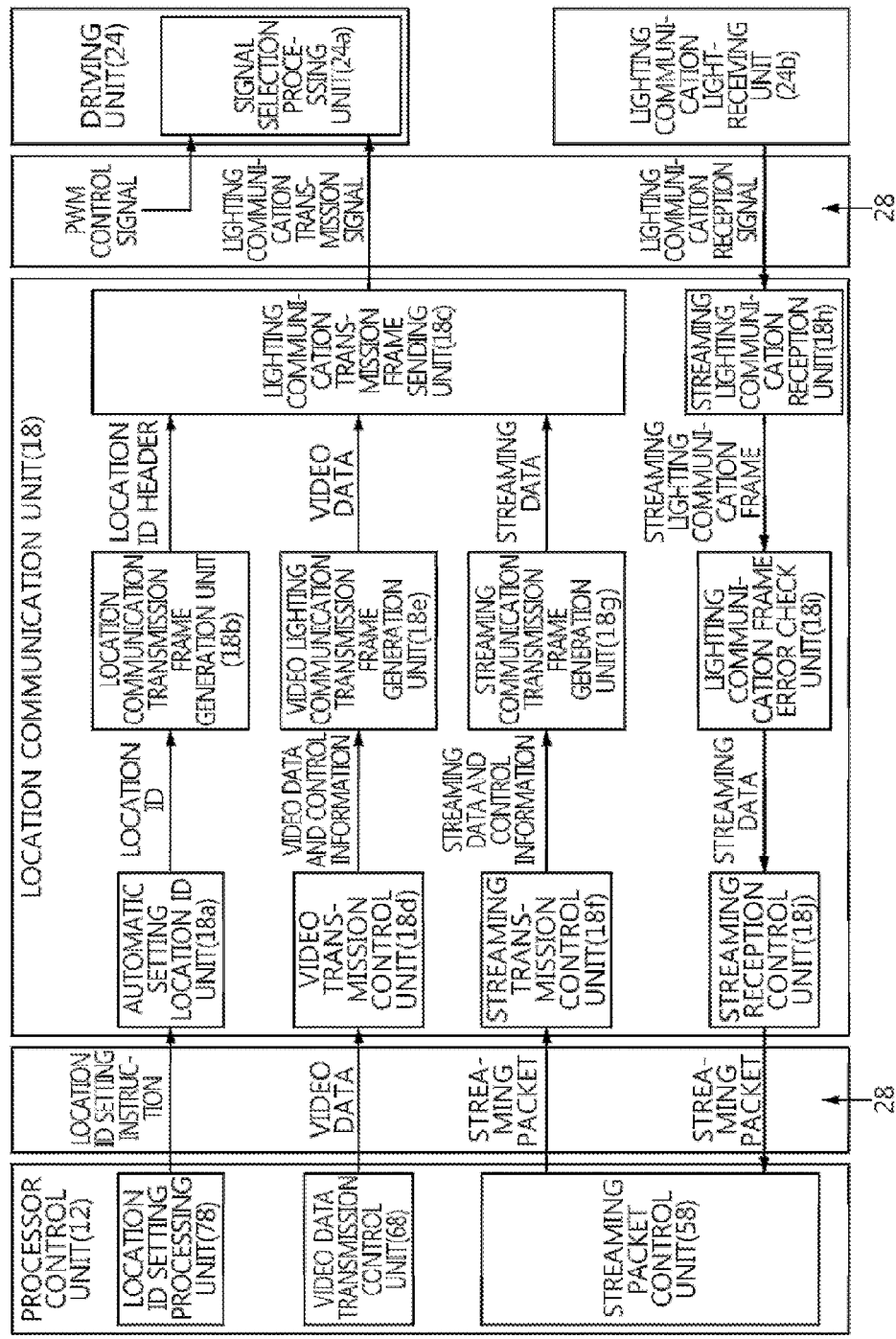
FIG. 6 is a diagram showing the configuration of a location communication unit shown in FIG. 1.

FIG. 6 is a diagram showing the configuration of the location communication unit shown in FIG. 1.

For the location communication unit 18, a location ID setting processing unit 78, a video data transmission control unit 68, and a streaming packet control unit 58 are provided in the processor control unit 12.

The location ID setting processing unit 78 generates an instruction related to the setting of a location ID and sends the instruction to the automatic setting location ID unit 18a of the location communication unit 18. Accordingly, an automatic setting location ID unit 18a automatically sets a location ID and sends the location ID to a location communication transmission frame generation unit 18b. The location communication transmission frame generation unit 18b sends the header information of the received location ID to a lighting communication transmission frame sending unit 18c. The lighting communication transmission frame sending unit 18c generates a lighting communication transmission signal based on the received header information of the location ID, and sends the signal to a signal selection processing unit 24a of the driving unit 24. The signal selection processing unit 24a of the driving unit 24 transfers the lighting communication transmission signal to the lighting device.

Video data provided through the video data transmission control unit 68 for the control of video data transmission is input to a video transmission control unit 18d via the SLSI 28 which is the standard interface. Accordingly, the video transmission control unit 18d sends the input video data and lighting control information to a video lighting communication transmission frame generation unit 18e. The video lighting communication transmission frame generation unit 18e configures the received data and information in the form of frames, and transmits the frames to the lighting communication transmission frame sending unit 18c. The lighting communication transmission frame sending unit 18c generates a lighting communication transmission signal based on the video data and the lighting control information received in the form of frames, and sends it to the signal selection processing unit 24a of the driving unit 24. The signal selection processing unit 24a of the driving unit 24 transmits the lighting communication transmission signal with the signal carried on light.

The streaming packet control unit 58 sends streaming packets to the streaming transmission control unit 18f of the location communication unit 18, and receives streaming packets through the streaming reception control unit 18j of the location communication unit 18. Upon transmission, the streaming transmission control unit 18*f* sends the input streaming packets and lighting control information to a streaming communication transmission frame generation unit 18*g*, and the streaming communication transmission frame generation unit 18*g* configures the received packets and the lighting control information in the form of frames and transmits the frames to the lighting communication transmission frame sending unit 18*c*. The lighting communication transmission frame sending unit 18*c* generates a lighting communication transmission signal based on the streaming packets and lighting control information received in the form of frames, and sends the lighting communication transmission signal to the signal selection processing unit 24*a* of the driving unit 24. The signal selection processing unit 24*a* of the driving unit 24 transmits the lighting communication transmission signal with the signal carried on light. Meanwhile, the streaming lighting communication reception unit 18*h* of the location communication unit 18 receives a lighting communication reception signal from the lighting communication light-receiving unit 24*b* of the driving unit 24 through the SLSI 28 which is the standard interface. The streaming lighting communication reception unit 18*h* converts the input lighting communication reception signal into a frame-format streaming lighting communication signal and sends it to a lighting communication frame error check unit 18*i*. Accordingly, the lighting communication frame error check unit 18*i* checks errors in the frame-format streaming lighting communication signal, and then sends the streaming packets to the streaming packet control unit 58 of the processor control unit 12 through the streaming reception control unit 18*j*.

Figure 7:
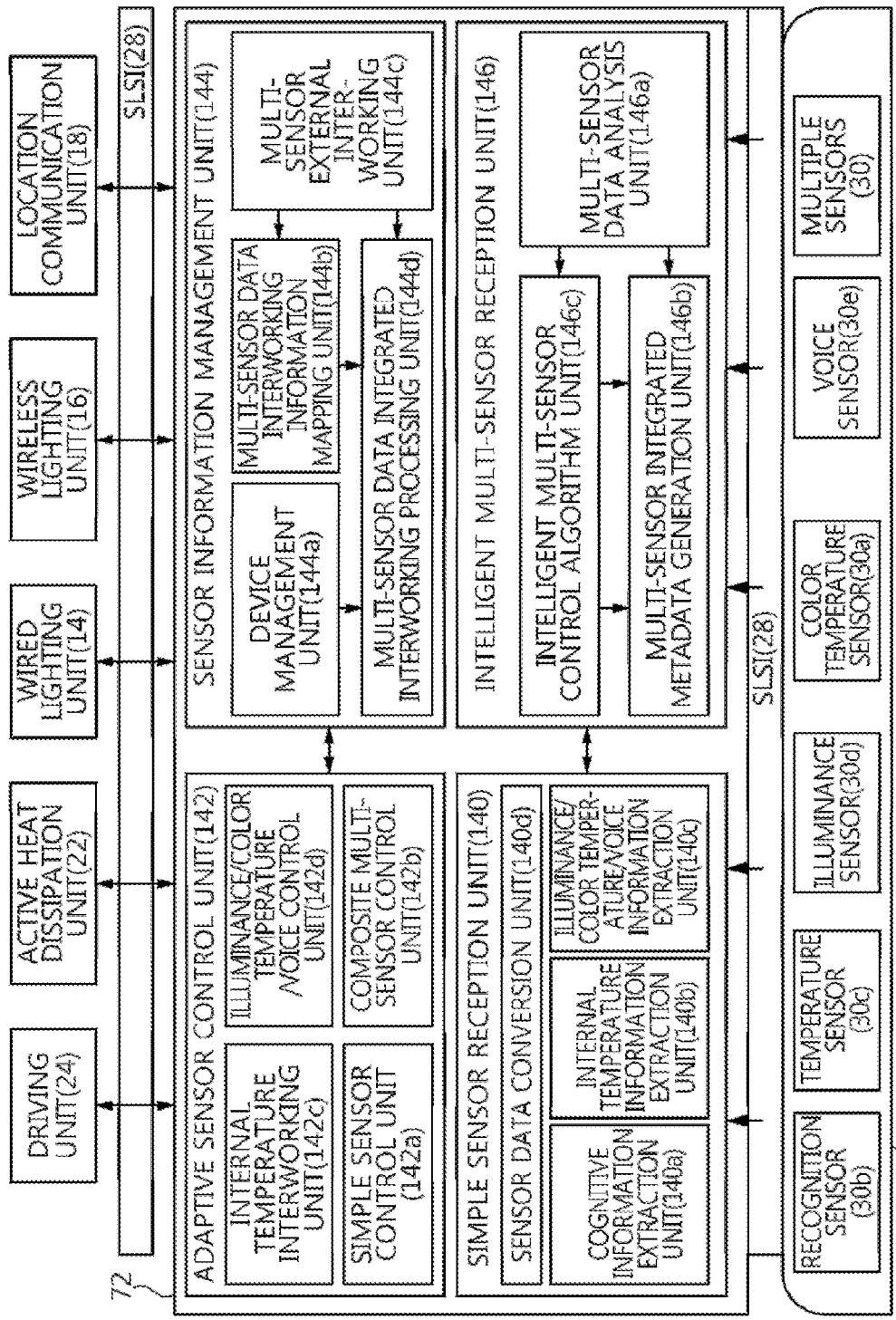
FIG. 7 is a diagram showing the internal configuration of the sensor control unit of a processor control unit shown in FIG. 1.

FIG. 7 is a diagram showing the internal configuration of the sensor control unit of the processor control unit shown in FIG. 1.

The sensor control unit 72 of the processor control unit 12 has a software structure for operating in conjunction with the multi-sensor unit 20.

The sensor control unit 72 includes a simple sensor reception unit 140, an adaptive sensor control unit 142, a sensor information management unit 144, and an intelligent multi-sensor reception unit 146.

In order to perform a single sensor reception function, the simple sensor reception unit 140 includes a cognitive information extraction unit 140*a* for receiving cognitive information from a recognition sensor 30*b*, an internal temperature information extraction unit 140*b* for receiving temperature information from a temperature sensor 30*c*, an illuminance/color temperature/voice information extraction unit 140*c* for receiving information from an illuminance sensor 30*d*, a color temperature sensor 30*a*, and a voice sensor 30*e*, and a sensor data conversion unit 140*d* for converting the sensor information obtained from the cognitive information extraction unit 140*a*, the internal temperature information extraction unit 140*b*, and the illuminance/color temperature/voice information extraction unit 140*c* into data that can be processed.

In order to perform an adaptive sensor control function, the adaptive sensor control unit 142 includes a simple sensor control unit 142*a* for receiving information from the simple sensor reception unit 140, a composite multi-sensor control unit 142*b*, an internal temperature interworking unit 142*c* for transferring information to an application related to an internal temperature using the information received by the simple sensor control unit 142*a*, and an illuminance/color temperature/voice control unit 142*d* for converting the information received by the composite multi-sensor control unit 142*b* into lighting control information and then generating information that may be associated with lighting.

The sensor information management unit 144 receives various types of information (that is, pieces of sensor state information) provided by the adaptive sensor control unit 142 via a device management unit 144*a*. The various types of received information are transferred from a multi-sensor external interworking unit 144*c* to the outside via a multi-sensor data integrated interworking processing unit 144*d* and a multi-sensor data interworking information mapping unit 144*b*.

Unlike the function of the simple sensor reception unit 140, the intelligent multi-sensor reception unit 146 receives the information of the multiple sensors 30 and allows a multi-sensor integrated metadata generation unit 146*b* to generate metadata via a multi-sensor data analysis unit 146*a*. Further, the metadata is transmitted to an intelligent multi-sensor control algorithm unit 146*c*, and the intelligent multi-sensor control algorithm unit 146*c* generates control information for the multiple sensors 30 based on the input metadata, and sends the control information to the sensor information management unit 144. The control information transferred to the sensor information management unit 144 is used when sensor control is required.

Figure 8:
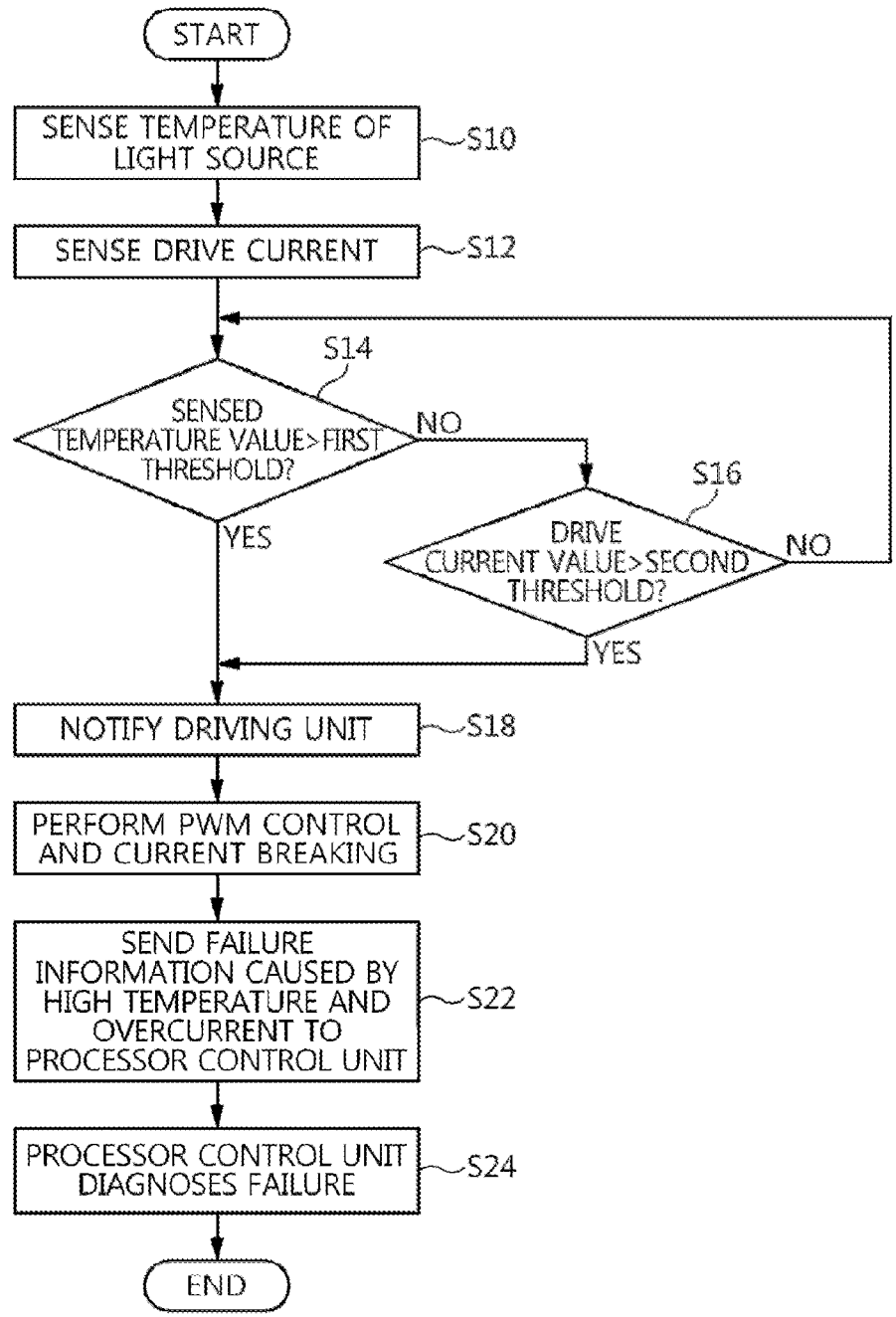
FIG. 8 is a flowchart showing a procedure in which the processor control unit uses an active heat dissipation function, supported by an active heat dissipation unit shown in FIG. 1, for a failure diagnosis function.

FIG. 8 is a flowchart showing a procedure in which the processor control unit uses an active heat dissipation function, supported by the active heat dissipation unit shown in FIG. 1, for a failure diagnosis function.

The active heat dissipation unit 22 supports light source heat dissipation required to support a heat dissipation function for the LED light source 42, board heat dissipation for the driving unit 24 via the sensing of drive current, and active heat dissipation and device heat dissipation performed using a device and the processor control unit 12 based on sensor data.

First, a temperature sensor 30*c* senses the temperature of the LED light source 42 at step S10. The sensed temperature data value of the light source is input to the active heat dissipation unit 22 via the multi-sensor unit 20 and the SLSI 28.

Further, a drive current sensor (not shown) senses the drive current of the LED light source 42 at step S12. Those skilled in the art will sufficiently understand a method of sensing drive current based on well-known technology. The sensed drive current value is input to the active heat dissipation unit 22 via the multi-sensor unit 20 and the SLSI 28.

The active heat dissipation unit 22 determines whether the input temperature data value exceeds a preset first threshold at step S14. If it is determined that the input temperature data value does not exceed the preset first threshold, the active heat dissipation unit 22 determines whether the input drive current value exceeds a preset second threshold at step S16.

If it is determined that the input temperature data value exceeds the preset first threshold ("Yes" at step S14) or if it is determined that the input drive current value exceeds the preset second threshold ("Yes" at step S16), the active heat dissipation unit 22 notifies the driving unit 24 of the results of the determination at step S18.

Accordingly, the driving unit 24 dissipates heat from the board by performing control, such as PWM control and current breaking, at step S20.

Further, the driving unit 24 sends failure information caused by abnormal high-temperature and overcurrent to the processor control unit 12 at step S22.

Therefore, the processor control unit 12 may diagnose a failure at step S24.

As described above, the temperature and drive current of the LED light source 42 are sensed to perform an active heat dissipation function, and information may be transferred so that it may be used for a failure diagnosis function.

Figure 9:
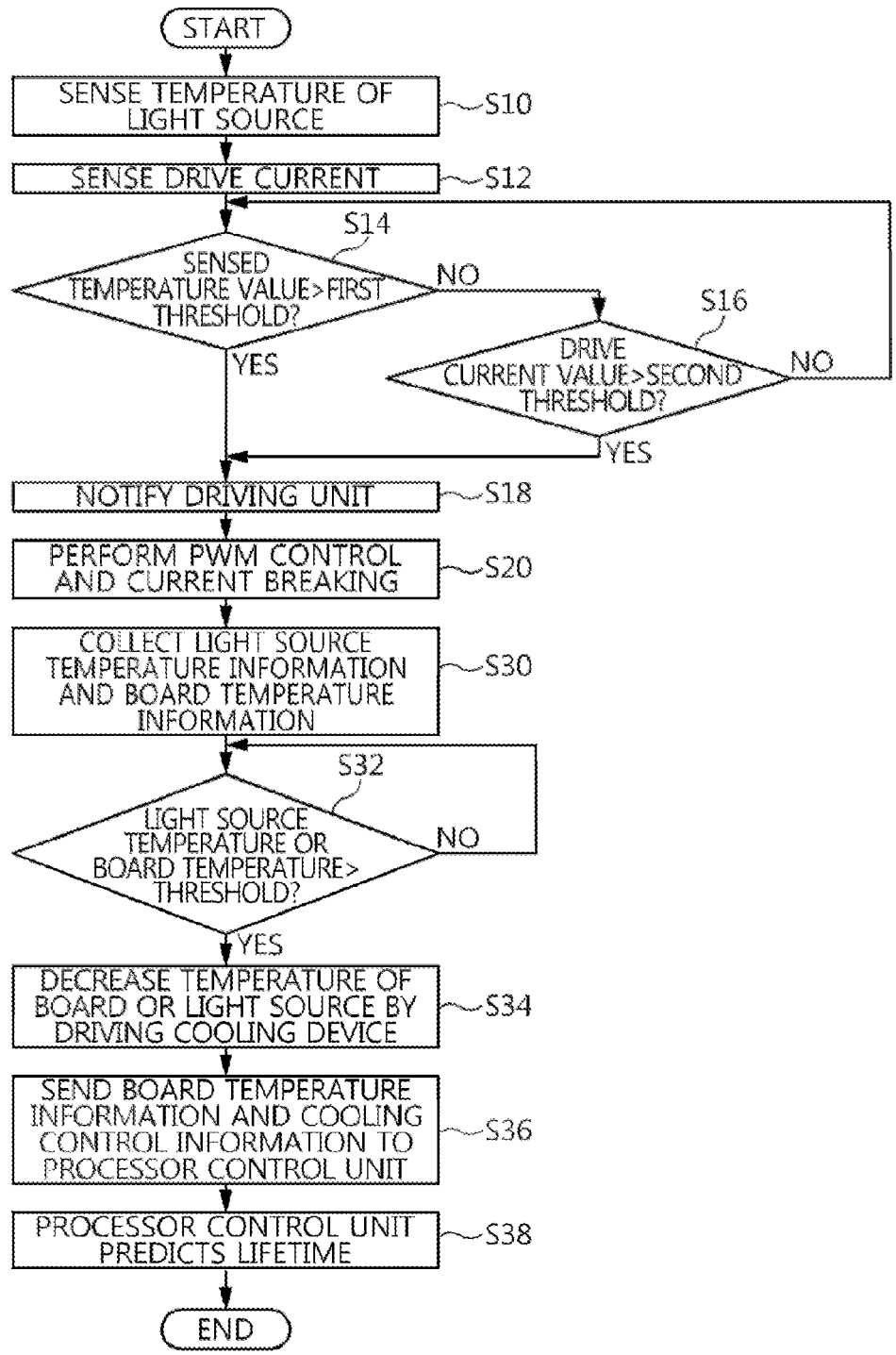
FIG. 9 is a flowchart showing a procedure in which the processor control unit uses the active heat dissipation function, supported by the active heat dissipation unit shown in FIG. 1, for a lifetime prediction function.

FIG. 9 is a flowchart showing a procedure in which the processor control unit uses an active heat dissipation function, supported by the active heat dissipation unit shown in FIG. 1, for a lifetime prediction function.

After operations at steps S10 to S20 have been performed with reference to FIG. 8, the active heat dissipation unit 22 collects light source temperature information and board temperature information at step S30. Here, the light source temperature information may be a value obtained by sensing the temperature of the LED light source 42 using the temperature sensor 30c, and the board temperature information may be a value obtained by sensing the temperature of a control board using the temperature sensor 30c.

The active heat dissipation unit 22 is configured to, if the light source temperature or the board temperature exceeds its own threshold ("Yes" at step S32), drive a cooling device, thus actively decreasing the temperature of the control board or the light source at step S34.

Further, the active heat dissipation unit 22 sends information about the board temperature and cooling control information to the processor control unit 12 at step S36. Of course, when the information about the board temperature and the cooling control information are sent to the processor control unit 12, failure information related to abnormal high temperature and overcurrent from the driving unit 24 is transmitted to the processor control unit 12.

Accordingly, the processor control unit 12 may perform a lifetime prediction function at step S38.

As described above, the active heat dissipation function may be performed by sensing the temperature of the board, the temperature of the LED light source 42, and the drive current, and the sensed information may be transferred so that it is used for the lifetime prediction function.

Figure 10:
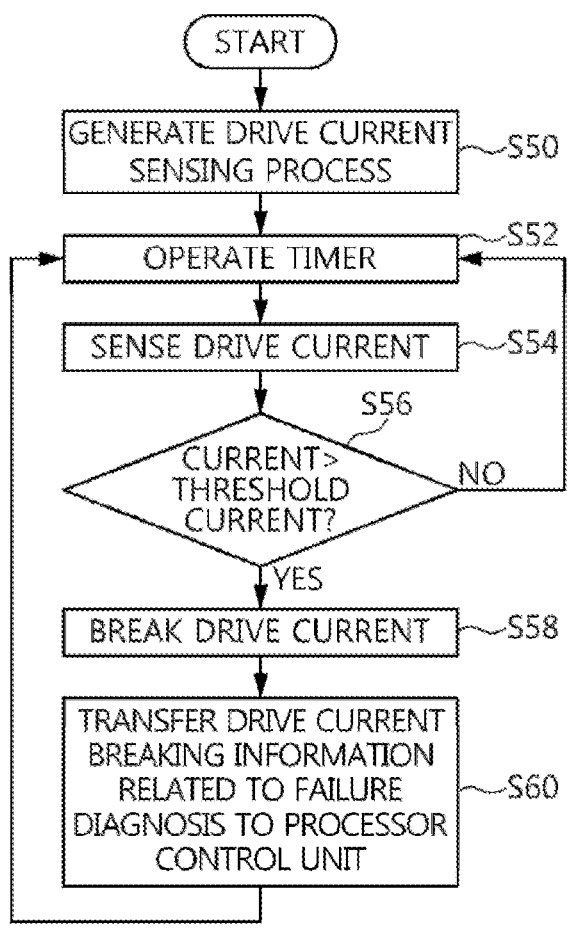
FIG. 10 is a flowchart showing a procedure in which drive current breaking information related to failure diagnosis is generated in FIG. 8 or 9.

FIG. 10 is a flowchart showing a procedure in which drive current breaking information related to failure diagnosis is generated in FIG. 8 or 9.

For active heat dissipation, the active heat dissipation unit 22 generates a process for sensing drive current at step S50.

The generated process is operated by a timer at step S52.

Thereafter, the drive current sensing process is configured to sense drive current at step S54.

Further, the drive current sensing process is configured to, if the sensed drive current exceeds a threshold ("Yes" at step S56), break the drive current at step S58. If the sensed drive current does not reach the threshold ("No" at step S56), the drive current sensing process waits in a waiting mode until the timer resumes operation.

After step S58, the drive current sensing process is configured to transfer drive current breaking information related to failure diagnosis to the processor control unit 12 at step S60.

Figure 11:
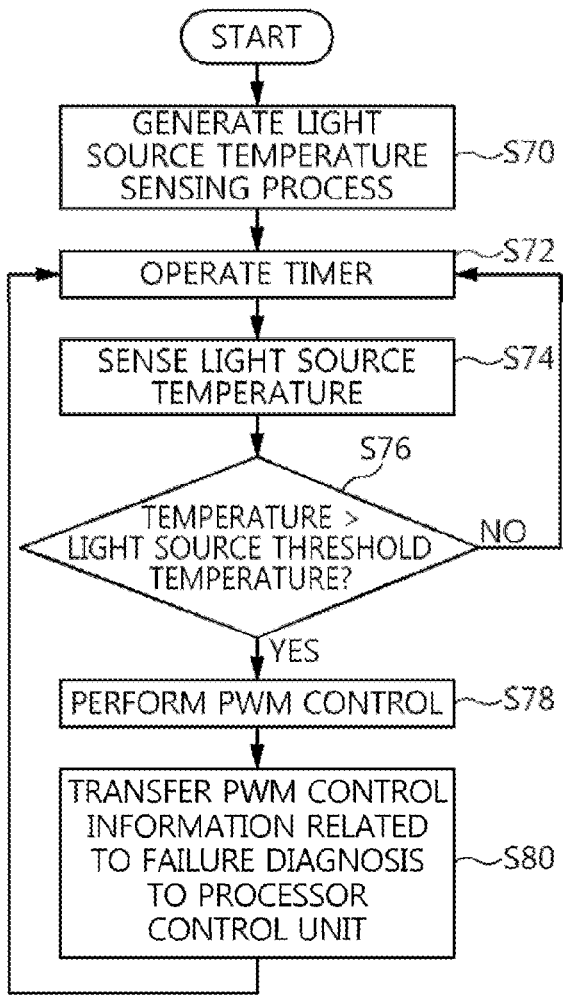
FIG. 11 is a flowchart showing a procedure in which PWM control information related to failure diagnosis is generated in FIG. 8 or 9.

FIG. 11 is a flowchart showing a procedure in which Pulse Width Modulation (PWM) control information related to failure diagnosis is generated in FIG. 8 or 9.

In order to perform active heat dissipation, the active heat dissipation unit 22 generates a process for sensing the temperature of the light source at step S70.

The generated process is operated by a timer at step S72.

Thereafter, the light source temperature sensing process is configured to sense the temperature of the light source at step S74.

Further, the light source sensing process is configured to, if the sensed light source temperature exceeds a threshold ("Yes" at step S76), decrease a driving level by controlling a PWM signal at step S78. If the sensed light source temperature does not reach the threshold ("No" at step S76), the light source temperature sensing process waits in a waiting mode until the timer resumes operation.

After step S78, the light source temperature sensing process is configured to transfer PWM control information related to failure diagnosis to the processor control unit 12 at step S80.

Figure 12:
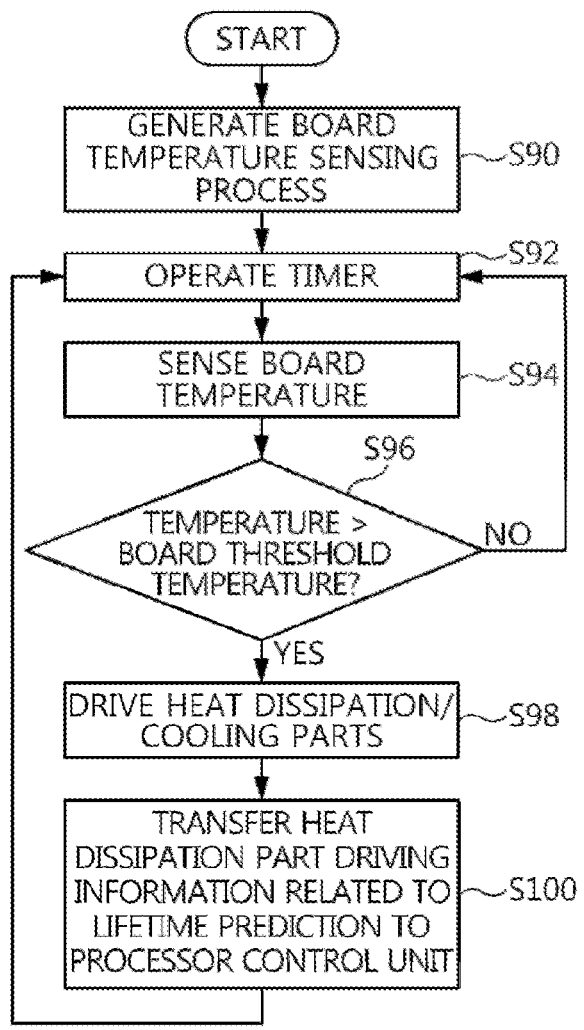
FIG. 12 is a flowchart showing a procedure in which heat dissipation part driving information related to lifetime prediction is generated in FIG. 9.

FIG. 12 is a flowchart showing a procedure in which heat dissipation part driving information related to lifetime prediction is generated in FIG. 9.

In order to perform active heat dissipation, the active heat dissipation unit 22 generates a process for sensing the temperature of the board at step S90.

The generated process is operated by a timer at step S92.

Thereafter, the board temperature sensing process is configured to sense the temperature of the board at step S94.

Further, the board temperature sensing process is configured to, if the sensed board temperature exceeds a threshold ("Yes" at step S96), drive a heat dissipation and cooling device at step S98. If the sensed board temperature does not reach the threshold ("No" at step S96), the board temperature sensing process waits in a waiting mode until the timer resumes operation.

After step S98, the board temperature sensing process is configured to transfer heat dissipation part driving information related to lifetime prediction to the processor control unit 12 at step S100.

Figure 13:
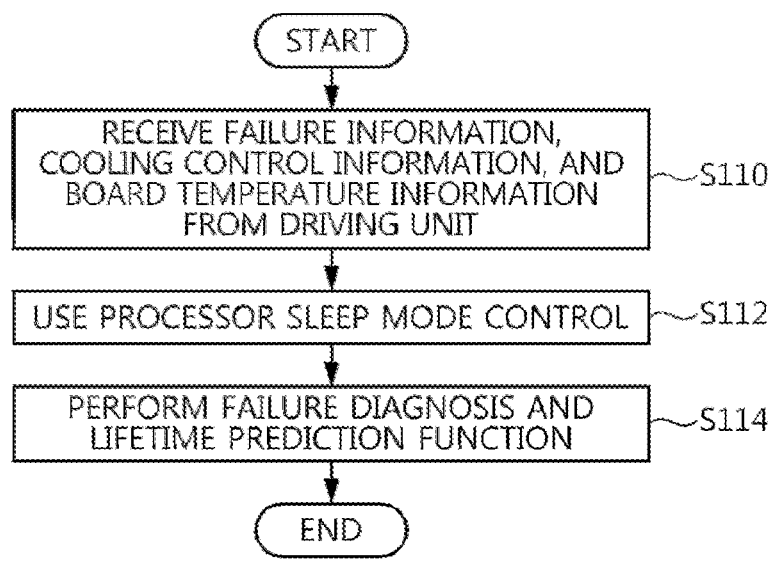
FIG. 13 is a flowchart showing a procedure in which the processor control unit shown in FIG. 1 performs a failure diagnosis and lifetime prediction function.

FIG. 13 is a flowchart showing a procedure in which the processor control unit shown in FIG. 1 performs a failure diagnosis and lifetime prediction function.

The processor control unit 12 receives failure information, cooling control information, board temperature information, etc. from the driving unit 24 at step S110. Here, the failure information, cooling control information, and board temperature information may be sufficiently understood from the description of FIGS. 8 to 12.

Then, the processor control unit 12 performs a highly-reliable failure diagnosis and lifetime prediction function using a processor sleep mode control function at steps S112 and S114.

Further, in order to perform an effective heat dissipation function, the board is configured in a shape in which a hole is formed at the center of the board, and thus a cooling device capable of exhibiting the same effect as that when heat is drained through a chimney may be manufactured.

Figure 14:
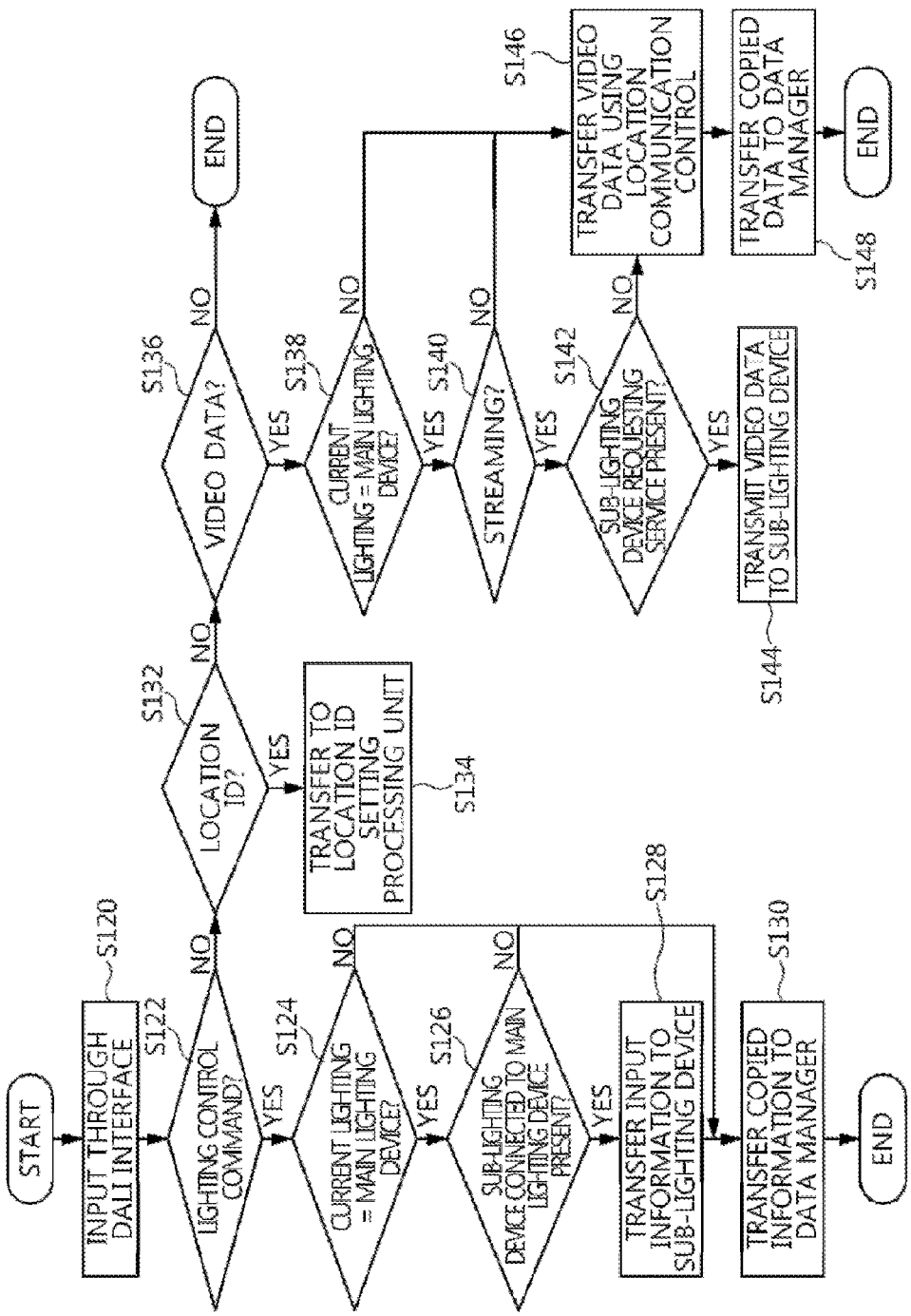
FIG. 14 is a flowchart showing a procedure in which the wired lighting control processing unit of the processor control unit processes information input through a DALI interface in FIG. 1.

FIG. 14 is a flowchart showing a procedure in which the wired lighting control processing unit of the processor control unit processes information input through a DALI interface in FIG. 1.

Data input through the DALI interface may be a lighting control command, a location ID, or video data at step S120.

The wired lighting control processing unit 56 checks whether data input through the DALI interface is a lighting control command at step S122.

If the data input through the DALI interface is the lighting control command ("Yes" at step S122), the wired lighting control processing unit 56 checks whether current lighting is a main lighting device or a sub-lighting device at step S124.

If the current lighting is the main lighting device, the wired lighting control processing unit 56 determines whether a sub-lighting device connected to the main lighting device is present at step S126.

If it is determined that the sub-lighting device connected to the main lighting device is present, the wired lighting control processing unit 56 transfers the input information (that is, the lighting control command) to the sub-lighting device connected to the main lighting device at step S128.

Thereafter, the wired lighting control processing unit 56 transfers copied information to the data manager 64 so as to monitor the corresponding information at step S130.

Meanwhile, if the data input through the DALI interface is a location ID ("Yes" at step S132), the wired lighting control processing unit 56 transfers the input location ID to the location ID setting processing unit 78 at step S134.

Finally, if the data input through the DALI interface is video data ("Yes" at step S136), the wired lighting control processing unit 56 checks whether current system lighting is a main lighting device at step S138.

If the current system lighting is the main lighting device, the wired lighting control processing unit 56 determines whether a current situation is a situation in which a streaming service is to be provided at step S140.

If it is determined that the current situation is the situation in which the streaming service is to be provided, the wired lighting control processing unit 56 determines whether a sub-lighting device requesting the streaming service is present at step S142.

If it is determined that the sub-lighting device requesting the streaming service is present, the wired lighting control processing unit 56 transmits video data to the sub-lighting device requesting the streaming service at step S144.

Further, the video data is transferred using the control of location communication at step S146, and copied data is transferred to the data manager 64 at step S148.

If it is determined that the current lighting is not a main lighting device, but is a sub-lighting device, and if the service is not a streaming service, but is a video service, the video data is transferred using the control of location communication, and the process is terminated.

Figure 15:
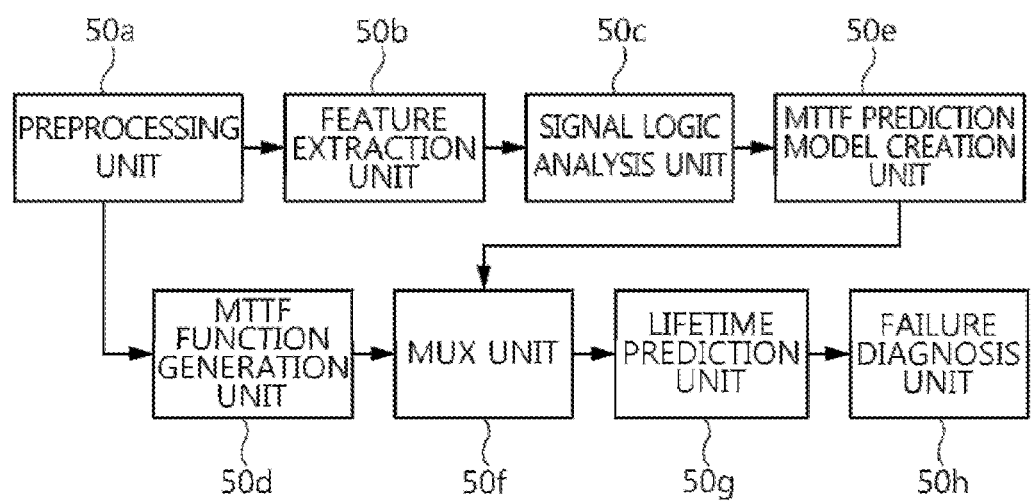
FIG. 15 is a diagram showing the internal configuration of a failure diagnosis/lifetime prediction control unit shown in FIG. 3.

FIG. 15 is a diagram showing the internal configuration of the failure diagnosis/lifetime prediction control unit shown in FIG. 3.

The failure diagnosis/lifetime prediction control unit 50 of the processor control unit 12 includes a preprocessing unit 50a, a feature extraction unit 50b, a signal logic analysis unit 50c, a Mean Time To Failure (MTTF) function generation unit 50d, an MTTF prediction model creation unit 50e, a multiplexer (MUX) unit 50f, a lifetime prediction unit 50g, and a failure diagnosis unit 50h.

The preprocessing unit 50a individually receives a measured illuminance value $L_S$ from the multi-sensor unit 20, the internal temperature value $T_A$ of lighting from the active heat dissipation unit 22, and the PWM output sensing value $I_F$ of the lighting from the driving unit 24, respectively, and performs preprocessing procedures, such as noise cancellation and validity verification. For a noise cancellation scheme, a low-pass filter, a median filter, a Kalman filter, or the like is used. Validity verification is performed in consideration of a scheme for determining whether each output falls within a range from the minimum to the maximum of the corresponding output.

The feature extraction unit 50b extracts feature elements based on data $L_S$, $T_A$, and $I_F$ preprocessed by the preprocessing unit 50a. That is, the feature extraction unit 50b functions to extract third- or higher-order parameter values, on which linear regression analysis has been performed using differential values and accumulative values depending on time (sequence).

The signal logic analysis unit 50c derives a curve indicative of the form of variations in the feature data, extracted by the feature extraction unit 50b, depending on time (sequence). For example, the signal logic analysis unit 50c derives an attenuation curve of the light source using an unsupervised learning scheme such as a hidden Markov model or self-organization feature map.

The Mean Time To Failure (MTTF) function generation unit 50d fetches third- or higher-order parameter value information $D_C$ of the light source attenuation curve indicating light source output characteristics for temperature and light source current input, which are stored in the processor control unit 12 or the lighting control server 36, over time. Further, the MTTF function generation unit 50d receives the lighting internal temperature value $T_A$ and the lighting PWM output sensing value $I_F$ preprocessed by the preprocessing unit 50a. Therefore, the MTTF function generation unit 50d generates an MTTF function based on the parameter value information $D_C$, the lighting internal temperature value $T_A$, and the lighting PWM output sensing value $I_F$. For example, the MTTF function may have the form $F_{MTTF}(T_A, I_F, D_C) = c1(D_{C3} \times T_A^3 - D_{C2} \times T_A^2 + D_{C1} \times T_A) + c2 \times I_F = T_{MTTF}$. The mean time to the failure of the lighting (for example, the LED light source) may be detected using the MTTF function generated by the MTTF function generation unit 50d.

The MTTF prediction model creation unit 50e generates time $T_{MTTF}$ which is the mean time to the failure of the lighting (for example, the LED light source) by using the lighting internal temperature value $T_A$, the lighting PWM output sensing value $I_F$, and the measured illuminance value $L_S$ as inputs, based on the light source attenuation curve model derived by the signal logic analysis unit 50c.

The light source attenuation curve is data provided by a light source manufacturer, and the precision thereof may be deteriorated due to various transformational factors, such as an external temperature change, a humidity change, and a climate change, in a typical actual inspection environment. Therefore, the multiplexer (MUX) unit 50f performs multiplexing by receiving the output of the MTTF function generation unit 50d and the output of the MTTF prediction model creation unit 50e. The MUX unit 50f may select any one of the output of the MTTF function generation unit 50d and the output of the MTTF prediction model creation unit 50e depending on the required precision or situation. Here, the required precision or situation may be variably set. A method of variably setting precision or a situation may be sufficiently understood by those skilled in the art from well-known technology. In the embodiment of the present invention, any one of the output of the MTTF function generation unit 50d and the output of the MTTF prediction model creation unit 50e is selectively used in order to precisely predict the mean time to the failure of the lighting, without unconditionally using only the results of the MTTF function generation unit 50d.

The lifetime prediction unit 50g predicts a difference between the mean time to failure $T_{MTTF}$ and the operating time $T_{RUN}$ of the lighting stored in the lighting control server 36 or the processor control unit 12 as the remaining lifetime of the lighting ($T_{LIFETIME} = T_{MTTF} - T_{RUN}$). Further, the lifetime prediction unit 50g transfers the predicted remaining lifetime $T_{LIFETIME}$ of the lighting to the information storage of the lighting control server 36 or the processor control unit 12.

The failure diagnosis unit 50h compares a failure determination reference time K stored in the lighting control server 36 or the processor control unit 12 with the remaining lifetime $T_{LIFETIME}$ of the lighting predicted by the lifetime prediction unit 50g. The failure diagnosis unit 50h diagnoses the corresponding lighting as having failed if the predicted remaining lifetime $T_{LIFETIME}$ of the lighting is equal to or less than the failure determination reference time K. Further, the failure diagnosis unit 50*h* provides failure diagnosis information to the processing module of the lighting control server 36 or the processor control unit 12.

Figure 16:
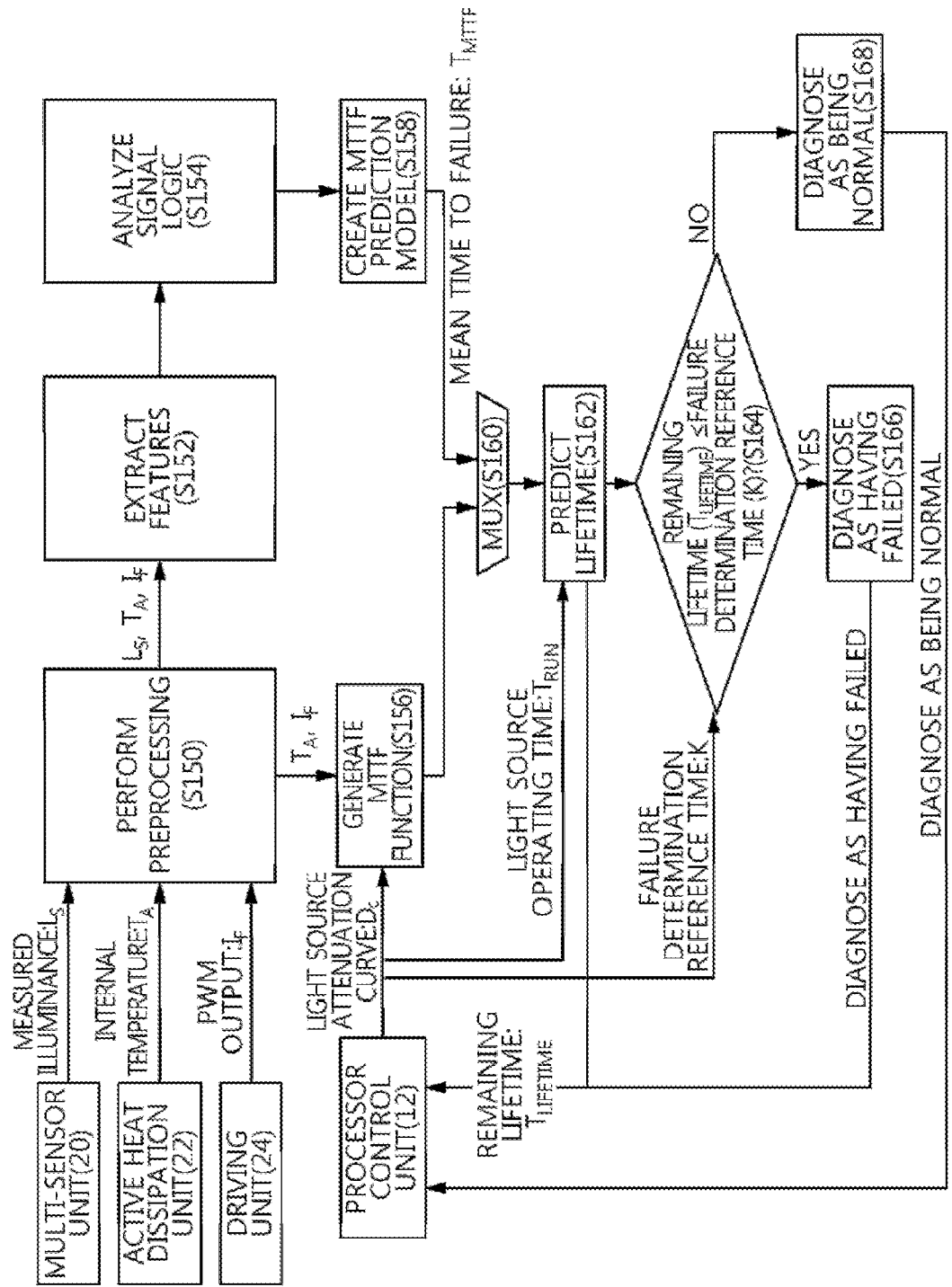
FIG. 16 is a flowchart showing a procedure processed by the failure diagnosis/lifetime prediction control unit shown in FIG. 15.

FIG. 16 is a flowchart showing a procedure processed by the failure diagnosis/lifetime prediction control unit shown in FIG. 15.

First, the preprocessing unit 50*a* receives a measured illuminance value $L_S$, the internal temperature value $T_A$ of lighting and the PWM output sensing value $I_F$ of the lighting and performs preprocessing such as noise cancellation and validity verification at step S150.

Thereafter, the feature extraction unit 50*b* extracts third- or higher-order parameters, on which linear regression analysis has been performed using feature elements, that is, differential values and accumulative values depending on time (sequence), based on the data $L_S$, $T_A$, and $I_F$ preprocessed by the preprocessing unit 50*a* at step S152.

The signal logic analysis unit 50*c* derives a curve (an attenuation curve of the light source) indicative of the form of variations in the feature data, extracted by the feature extraction unit 50*b*, depending on the time (sequence) at step S154.

Meanwhile, the results of the preprocessing are also applied to the MTTF function generation unit 50*d*. The MTTF function generation unit 50*d* generates an MTTF function using the third- or higher-order parameter value information $D_C$ of the light source attenuation curve, indicative of the light source output characteristics for temperature and light source current input, stored in the processor control unit 12 or the lighting control server 36, over time, the lighting internal temperature value $T_A$, and the lighting PWM output sensing value $I_F$ at step S156.

The MTTF prediction model creation unit 50*e* generates the mean time to failure $T_{MTTF}$ by using the lighting internal temperature value $T_A$, the lighting PWM output sensing value $I_F$, and the measured illuminance value $L_S$ as inputs, based on the light source attenuation curve model derived by the signal logic analysis unit 50*c* at step S158.

Thereafter, any one of the output of the MTTF function generation unit 50*d* and the output of the MTTF prediction model creation unit 50*e* is selected by the MUX unit 50*f* at step S160.

Then, the lifetime prediction unit 50*g* predicts a difference between the mean time to failure $T_{MTTF}$ and the operating time $T_{RUN}$ of the lighting, stored in the lighting control server 36 or the processor control unit 12, as the remaining lifetime of the lighting ($T_{LIFETIME} = T_{MTTF} - T_{RUN}$) at step S162. Information about the predicted remaining lifetime $T_{LIFETIME}$ of the lighting is transferred to the information storage of the lighting control server 36 or the processor control unit 12.

Furthermore, the failure diagnosis unit 50*h* compares the failure determination reference time K stored in the lighting control server 36 or the processor control unit 12 with the remaining lifetime $T_{LIFETIME}$ predicted by the lifetime prediction unit 50*g*, and diagnoses the lighting as having failed at step S166 if the predicted remaining lifetime $T_{LIFETIME}$ of the lighting is equal to or less than the failure determination reference time K ("Yes" at step S164). Information about failure diagnosis is provided to the processing module of the lighting control server 36 or the processor control unit 12.

If the predicted remaining lifetime $T_{LIFETIME}$ of the lighting is greater than the failure determination reference time K, the failure diagnosis unit 50*h* diagnoses the lighting as being normal at step S168.

In accordance with the present invention having the above configuration, a scheme is proposed which configures system lighting by modularizing technology that can be integrated with lighting into a small module.

The system lighting that can be achieved in the present invention not only can reduce energy consumption, but also can accommodate various types of parts via the modularization of standardized engines, and can implement convenient and comfortable lighting by means of convergence of lighting control technology and IT.

Further, the present invention provides various types of services via lighting, thus utilizing lighting as an information infrastructure.

Meanwhile, the present invention is not limited by the above-described embodiments and can be modified and changed in various manners without departing from the gist the invention. It should be noted that the technical spirit of those modifications and changes belongs to the spirit and scope of the accompanying claims.

What is claimed is:

1. A Light Emitting Diode (LED) lighting control apparatus comprising:
   a failure diagnosis/lifetime prediction control unit for diagnosing whether LED lighting has failed and predicting a remaining lifetime of the LED lighting, based on temperature sensor information and drive current sensor information of the LED lighting;
   a color temperature/illuminance correction control unit for adjusting color temperature and illuminance of the LED lighting, based on color temperature sensor information and illuminance sensor information of the LED lighting;
   a wireless lighting control processing unit for interpreting a lighting control command for the LED lighting received in a wireless manner, and performing lighting control corresponding to the lighting control command;
   a wired lighting control processing unit for, as input data is lighting control information for the LED lighting connected in a wired manner, sending the lighting control information to a driving unit for driving the LED lighting;
   an active heat dissipation control unit for actively dissipating heat from the LED lighting, based on the temperature sensor information and the drive current sensor information of the LED lighting; and
   a location identification (ID) setting processing unit for providing location ID information of the LED lighting.

2. The LED control apparatus of claim 1, wherein the failure diagnosis/lifetime prediction control unit comprises:
   a feature extraction unit for extracting feature data based on a measured illuminance value, an internal temperature value of the lighting, and a Pulse Width Modulation (PWM) output sensing value of the lighting, which are externally applied;
   a signal logic analysis unit for deriving a curve indicative of a form of variations in the feature data, extracted by the feature extraction unit, depending on time;
   a Mean Time To Failure (MTTF) function generation unit for generating an MTTF function based on the lighting internal temperature value, the lighting PWM output sensing value, and parameter value information of a pre-stored light source attenuation curve;
   an MTTF prediction model creation unit for generating a mean time to failure of the LED lighting by using the measured illuminance value, the lighting internal temperature value, and the lighting PWM output sensing value as inputs, based on results derived by the signal logic analysis unit;
   a multiplexer (MUX) unit for selecting any one of output of the MTTF function generation unit and output of the MTTF prediction model creation unit, depending on required precision;

a lifetime prediction unit for predicting a remaining lifetime of the LED lighting, based on the mean time to failure output from the MUX unit and a pre-stored operating time of the LED lighting; and a failure diagnosis unit for diagnosing whether the LED lighting has failed, based on the remaining lifetime of the LED lighting predicted by the lifetime prediction unit and a pre-stored failure determination reference time.

3. The LED lighting control apparatus of claim 2, wherein the lifetime prediction unit predicts a difference between the mean time to failure, output from the MUX unit, and the pre-stored operating time of the LED lighting, as the remaining lifetime of the LED lighting.

4. The LED lighting control apparatus of claim 2, wherein the failure diagnosis unit diagnoses the LED lighting as having failed if the remaining lifetime of the LED lighting predicted by the lifetime prediction unit is equal to or less than the pre-stored failure determination reference time.

5. The LED lighting control apparatus of claim 2, wherein the failure diagnosis/lifetime prediction control unit further comprises a preprocessing unit for preprocessing the measured illuminance value, the lighting internal temperature value, and the lighting PWM output sensing value, and transmitting results of preprocessing to the feature extraction unit and the MTTF function generation unit.

6. A Light Emitting Diode (LED) lighting control system comprising:

a wired lighting unit connected to LED lighting in a wired manner and configured to perform lighting control on the LED lighting;

wireless lighting unit configured to perform lighting control on the LED lighting via wireless communication with a wireless terminal and to operate in conjunction with the wired lighting unit;

a location communication unit configured to allocate individual IDs of the LED lighting and perform transmission/reception of data to/from an external terminal;

a multi-sensor unit configured to support multiple sensors and analyze sensor data collected from the multiple sensors;

an active heat dissipation unit configured to dissipate heat from the LED lighting based on the sensor data analyzed by the multi-sensor unit; and a processor control unit configured to control operations of the wired lighting unit, the wireless lighting unit, the location communication unit, the multi-sensor unit, and the active heat dissipation unit.

7. The LED lighting control system of claim 6, wherein:

the LED lighting comprises a main lighting device and a sub-lighting device connected to the main lighting device, and the wired lighting unit comprises a Digital Addressable Lighting Interface (DALI) transceiver and an Ethernet transceiver for the main lighting device, and comprises a DALI transceiver for the sub-lighting device.

8. The LED lighting control system of claim 6, wherein the wireless lighting unit performs wireless communication with the wireless terminal via one of Zigbee wireless communication and WiFi wireless communication.

9. The LED lighting control system of claim 6, wherein the wireless lighting unit comprises:

a wireless simple lighting control unit for turning on/off the LED lighting, adjusting illuminance of the LED lighting, and monitoring the LED lighting in real time;

a wireless smart lighting control unit for turning on/off power of the LED lighting on a group basis, adjusting illuminance of lighting of each group, controlling a structure of a wireless lighting network, and monitoring and reporting a state of the LED lighting;

a wireless communication unit for performing a wireless interface with the wireless terminal; and a conversion protocol unit for operating in conjunction with the wired lighting unit.

10. The LED lighting control system of claim 6, wherein the location communication unit performs transmission/reception of data to/from the external terminal via one of data transmission/reception using visible light communication, and video and streaming data transmission/reception using lighting communication transmission/reception.

11. The LED lighting control system of claim 6, wherein the processor control unit comprises:

a failure diagnosis/lifetime prediction control unit for diagnosing whether LED lighting has failed and predicting a remaining lifetime of the LED lighting, based on temperature sensor information and drive current sensor information of the LED lighting;

a color temperature/illuminance correction control unit for adjusting color temperature and illuminance of the LED lighting, based on color temperature sensor information and illuminance sensor information of the LED lighting;

a wireless lighting control processing unit for interpreting a lighting control command for the LED lighting received in a wireless manner, and performing lighting control corresponding to the lighting control command;

a wired lighting control processing unit for, as input data is lighting control information for the LED lighting connected in a wired manner, sending the lighting control information to a driving unit for driving the LED lighting;

an active heat dissipation control unit for actively dissipating heat from the LED lighting, based on the temperature sensor information and the drive current sensor information of the LED lighting; and a location ID setting processing unit for providing location ID information of the LED lighting.

* * * * *